United States Patent
Zhang et al.

(10) Patent No.: US 6,358,365 B1
(45) Date of Patent: Mar. 19, 2002

(54) METAL SILICATES, CELLULOSE PRODUCTS, AND PROCESSES THEREOF

(75) Inventors: Fushan Zhang; Jimei Tong; Tom E. Taggart, all of Jacksonville, FL (US)

(73) Assignee: Hercules Incorporated, Wilmington, DE (US)

( * ) Notice: Subject to any disclaimer, the term of this patent is extended or adjusted under 35 U.S.C. 154(b) by 0 days.

(21) Appl. No.: 09/459,890

(22) Filed: Dec. 14, 1999

(51) Int. Cl.$^7$ .................. D21H 17/68; D21H 17/70; C01B 33/20; C02F 1/52
(52) U.S. Cl. .................. 162/181.7; 162/181.2; 423/331; 423/333; 210/716; 210/717
(58) Field of Search ................. 162/128, 145, 162/152, 156, 157.1, 158, 164.4, 181.1, 181.4, 181.6, 181.7, 183, 184, 185, 181.2, 181.3; 423/325, 326, 327.1, 328.1, 328.2, 330.1, 331, 332, 333; 210/702, 710, 711, 716, 717, 723, 724

(56) References Cited

U.S. PATENT DOCUMENTS

| | | | |
|---|---|---|---|
| 2,498,353 A | 2/1950 | Bierce | 423/331 |
| 2,786,758 A | 3/1957 | Taylor | 162/181.3 |
| 2,823,997 A | 2/1958 | Craig | 162/181.2 |
| 2,888,377 A | 3/1959 | Allen | 162/181.4 |
| 2,919,222 A | 12/1959 | Hall, Jr. | 162/181.6 |
| 2,935,438 A | 5/1960 | Craig | 162/181.3 |
| 3,032,394 A * | 5/1962 | Ishino | 423/330.1 |
| 3,190,789 A | 6/1965 | Taylor | 162/181.2 |
| 3,654,176 A | 4/1972 | Neumann et al. | 252/313 R |
| 4,339,421 A * | 7/1982 | Schultess et al. | 423/330.1 |
| 4,643,801 A | 2/1987 | Johnson | 162/164.1 |
| 4,753,710 A | 6/1988 | Langley et al. | 162/164.3 |
| 4,913,775 A | 4/1990 | Langley et al. | 162/164.3 |
| 4,927,498 A | 5/1990 | Rushmere | 162/168.3 |
| 4,954,220 A | 9/1990 | Rushmere | 162/168.3 |
| 4,995,986 A | 2/1991 | Mohn | 210/717 |
| 5,085,705 A * | 2/1992 | Withiam | 106/287.17 |
| 5,149,400 A | 9/1992 | Haase et al. | 162/181.6 |
| 5,185,206 A | 2/1993 | Rushmere | 428/403 |
| 5,194,120 A | 3/1993 | Peats et al. | 162/168.3 |
| 5,236,599 A * | 8/1993 | Birchall et al. | 210/724 |
| 5,240,561 A | 8/1993 | Kaliski | 162/138 |
| 5,470,435 A | 11/1995 | Rushmere et al. | 162/181.6 |
| 5,514,249 A | 5/1996 | Cauley et al. | 162/164.1 |
| 5,543,014 A | 8/1996 | Rushmere et al. | 162/181.6 |
| 5,626,721 A | 5/1997 | Rushmere et al. | 162/181.6 |
| 5,700,352 A | 12/1997 | Vinson et al. | 162/111 |
| 5,707,494 A | 1/1998 | Rushmere et al. | 162/181.6 |
| 5,811,360 A * | 9/1998 | Jubb | 501/35 |
| 5,989,714 A | 11/1999 | Drummond | 428/402 |

FOREIGN PATENT DOCUMENTS

| | | | |
|---|---|---|---|
| GB | 1477557 | 6/1977 | C01B/33/26 |
| JP | 63295794 | 12/1988 | D21H/3/78 |
| JP | 10-72793 | 3/1998 | D21H/17/37 |
| WO | 96/05139 | 2/1996 | C01B/33/26 |
| WO | 97/17289 | 5/1997 | C01B/33/20 |
| WO | 98/22653 | 5/1998 | D21H/17/28 |

OTHER PUBLICATIONS

English language abstract of JP 63–295794.
English language abstract of JP 10–72793.
J.G. Vail, "Soluble Silicates", *American Chemical Society, Monograph Series*, Reinhold Publishing Corporation, New York 36, USA, vol. 2, pp. 524–549, 1952.
A. Swerin et al., "Silica based microparticulate retention aid systems", *Paperi Ja Puu; Paper and Timber*, vol. 77, No. 4, pp. 215–221, 1995.
T. Lindström et al., "Aluminum based microparticulate retention aid systems", pp. 99–103, 1989.

* cited by examiner

*Primary Examiner*—Peter Chin
*Assistant Examiner*—Eric Hug
(74) *Attorney, Agent, or Firm*—Greenblum & Bernstein, P.L.C.

(57) ABSTRACT

Aqueous composition, including a water-soluble metal silicate complex which includes at least one divalent metal. A process for preparing an aqueous composition including water-soluble metal silicate complex includes combining monovalent cation silicate and divalent metal ions in an aqueous environment to form the water-soluble metal silicate complex. A process of modifying cellulose slurry includes adding an aqueous composition having water-soluble metal silicate complex which includes divalent metal to cellulose slurry. A process for preparing cellulose slurry includes adding monovalent cation silicate to cellulose slurry comprising a sufficient amount of divalent metal ions to combine with the monovalent cation silicate to form water-soluble metal silicate complex. A process of making cellulose product includes: adding an aqueous composition having water-soluble metal silicate complex including divalent metal to cellulose slurry; and forming cellulose product from the cellulose slurry. A process of making cellulose product includes: adding monovalent cation silicate to cellulose slurry comprising a sufficient amount of divalent metal ions to combine with the monovalent cation silicate to form water-soluble metal silicate complex; and forming cellulose product from the cellulose slurry. A cellulose product includes cellulose fiber and residue of at least one water-soluble metal silicate complex. A process for waste water treatment includes adding at least one water-soluble metal silicate complex to waste water, wherein the water-soluble metal silicate complex includes divalent metal. A process for waste water treatment includes adding monovalent cation silicate to waste water, wherein the waste water comprises divalent metal ions in an amount sufficient to combine with the monovalent cation silicate to form water-soluble metal silicate complex.

99 Claims, No Drawings

METAL SILICATES, CELLULOSE PRODUCTS, AND PROCESSES THEREOF

CROSS-REFERENCE TO RELATED APPLICATION

The present application expressly incorporates by reference herein the entire disclosure of U.S. application Ser. No. 09/459,891, entitled "Cellulose Products and Processes for Preparing the Same", which is concurrently filed with the present application.

BACKGROUND OF THE INVENTION

1. Field of the Invention

The present invention is directed to water-soluble metal silicate complexes, such as water-soluble metal silicate complexes containing at least one divalent metal. The present invention is also directed to processes for preparing water-soluble metal silicate complexes. The present invention further relates to waste water treatment processes using water-soluble metal silicate complexes. The present invention also relates to processes for preparing cellulose products, such as paper products, which processes involve adding at least one water-soluble metal silicate complex to a cellulose slurry, such as a paper slurry. Similarly, the present invention relates to processes for preparing cellulose products which processes involve adding at least one water-soluble metal silicate, such as a monovalent cation silicate, to a cellulose slurry so as to form a water-soluble metal silicate complex in the cellulose slurry. The present invention is also directed to cellulose products, such as paper products, containing water-soluble metal silicate complexes.

2. Background of the Invention and Related Art

Cellulose products, such as paperboards, tissue papers, writing papers, and the like are traditionally made by producing an aqueous slurry of cellulosic wood fibers, which may contain inorganic mineral extenders or pigments. The aqueous slurry is deposited on a moving wire or fabric to facilitate the formation of a cellulose matrix. The cellulose matrix is then drained, dried, and pressed into a final cellulose product. However, during the draining step, desired solid fibers, solid fines, and other solids are often removed along with the water. In this regard, solid fines include very short pulp fibers or fiber fragments and ray cells. Solid fines also include pigments, fillers, and other nonfibrous additives that may pass through the fabric during sheet formation. Furthermore, during draining, undesired water is often retained in the cellulose matrix. The removal of the desired solids and retention of undesired water adversely affects sheet formation, and thus yields cellulose products of lower quality. Further, the loss of desired solids is wasteful and costly to cellulose product manufacturers.

As a result, the paper industry continuously strives to provide processes for papermaking that improve the paper quality, increase productivity, and reduce manufacturing costs. Chemicals are often added to the fibrous slurry before the papermaking wire or fabric to improve drainage/dewatering and retention. These chemicals are called drainage and/or retention aids. Attempts have been made to add various drainage and/or retention aids in papermaking such as silicates, silica colloidals, microgels, and bentonites.

Papermaking retention aids increase the retention of fine furnish solids during the turbulent process of draining and forming the paper web. Without adequate retention of the fine solids, they are either lost to the process effluent or accumulate to high levels in the recirculating white water loop, causing potential deposit buildup and impaired paper machine drainage. Additionally, insufficient retention of the fine solids increases the papermaker's costs due to the loss of additives intended to be adsorbed on the fiber to provide the respective paper opacity, strength, or sizing properties.

For example, U.S. Patent No. 5,194,120 to Peats et al. discloses the addition of a cationic polymer and an amorphous metal silicate material to paper furnish to improve fines retention and drainage. The amorphous metal silicates of Peats et al. are white free-flowing powders, which form extremely small anionic colloidal particles when fully dispersed in water. These materials are usually synthesized by reacting a sodium silicate with a soluble salt of the appropriate metal ions, such as $Mg^{2+}$, $Ca^{2+}$, and/or $Al^{3+}$, to form a precipitate which is then filtered, washed, and dried.

WO 97/17289 and family member U.S. Pat. No. 5,989,714 to Drummond relates to a method of controlling drainage and/or retention in the formation of a paper matrix by using metal silicate precipitates. The metal silicate precipitates of Drummond are prepared by mixing a soluble metal salt with a soluble silicate.

JP 63295794 A to Naka-Mura relates to a neutral or weakly alkaline papermaking process which includes adding to the pulp slurry a cationic, water-soluble polymer and an aqueous solution of sodium silicate.

JP 1072793 to Haimo discloses a method for making paper by directly adding an aqueous solution of sodium orthosilicate to the paper slurry. The orthosilicate solution of Haimo is prepared in a separate step (e.g., treatment of aluminum sulfate to adjust the pH) prior to being added to the paper slurry.

U.S. Pat. Nos. 4,927,498; 4,954,220; 5,185,206; 5,470,435; 5,543,014; 5,626,721; and 5,707,494 to Rushmere and Rushmere et al. relate to the use of polysilicate microgels as retention and drainage aids in papermaking. The microgels of many of these patents are manufactured by an on-site process by reacting polysilicic acid with an alkali metal to form microgels which are then added to a paper furnish.

U.S. Pat. No. 5,240,561 to Kaliski relates to the use of microgels in papermaking processes. The microgels of Kaliski are prepared by a two step process. The first step involves the preparation of a transient, chemically reactive subcolloidal hydrosol by blending the paper furnish with two separate solutions. The second step is to blend an aqueous solution containing at least one cross-linking agent with the furnishes resulting from the first step to cross-link the in-situ-formed chemically reactive subcolloidal hydrosol and synthesize (in-situ) the complex functional microgel cements. The resulting cements flocculate the paper furnishes to form paper sheets.

U.S. Pat. No. 4,753,710 to Langley et al. and U.S. Pat. No. 5,513,249 to Cauley are directed to the use of bentonite clays in paper making.

Despite many attempts to provide various types of drainage and retention aids, there still remains a need in the cellulose products industry to provide drainage and retentions aids that are cost effective and at the same time simple to use. In addition, there is still a need for a process of making cellulose products that yields significant improvements in retention and drainage while maintaining good formation of the cellulose product, e.g., paper sheet.

There is still a remaining need for improving retention and drainage, especially for improving drainage in large production of cellulose products where productivity is otherwise reduced due to slow water drainage through thick fibrous mats.

SUMMARY OF THE INVENTION

An object of the present invention is to provide water-soluble metal silicate complexes, such as metal silicate complexes containing at least one divalent metal.

A further object of the present invention is to improve retention and drainage control in making cellulose products, such as paper, by adding a water-soluble metal silicate complex to a cellulose slurry, such as a paper slurry, or by forming a water-soluble metal silicate complex in a cellulose slurry.

Another object of the present invention is to provide processes for preparing cellulose products which processes involve adding at least one water-soluble metal silicate complex to a cellulose slurry, such as a paper slurry.

A similar object of the present invention is to provide processes for preparing cellulose products which processes involve adding at least one monovalent cation silicate to a cellulose slurry, such as a paper slurry, so as to form water-soluble metal silicate complex in the cellulose slurry.

Still another object of the present invention is to provide cellulose products, such as paper products, containing water-soluble metal silicate complexes.

Yet another object of the present invention is to provide a process of waste water treatment comprising adding or forming a water-soluble metal silicate complex in waste water.

In accordance with one aspect, the present invention is directed to an aqueous composition, comprising a water-soluble metal silicate complex which comprises at least one divalent metal.

In accordance with another aspect, the present invention is directed to a process for preparing an aqueous composition including water-soluble metal silicate complex, comprising combining monovalent cation silicate and divalent metal ions in an aqueous environment to form the water-soluble metal silicate complex.

In accordance with still another aspect, the present invention is directed to a process of modifying cellulose slurry, comprising adding an aqueous composition having water-soluble metal silicate complex which includes divalent metal to cellulose slurry.

In accordance with yet another aspect, the present invention is directed to a process for preparing cellulose slurry, comprising adding monovalent cation silicate to cellulose slurry comprising a sufficient amount of divalent metal ions to combine with the monovalent cation silicate to form water-soluble metal silicate complex.

In accordance with another aspect, the present invention is directed to a process of making cellulose product, comprising: adding an aqueous composition having water-soluble metal silicate complex including divalent metal to cellulose slurry; and forming cellulose product from the cellulose slurry.

In accordance with yet another aspect, the present invention is directed to a process of making cellulose product, comprising: adding monovalent cation silicate to cellulose slurry comprising a sufficient amount of divalent metal ions to combine with the monovalent cation silicate to form water-soluble metal silicate complex; and forming cellulose product from the cellulose slurry.

In accordance with another aspect, the present invention is directed to a cellulose product comprising cellulose fiber and residue of at least one water-soluble metal silicate complex. Preferably, the residue is present in an amount of about 50 to 10,000 ppm, based on $SiO_2$.

In accordance with still another aspect, the present invention is directed to a process for waste water treatment, comprising adding at least one water-soluble metal silicate complex to waste water, wherein the water-soluble metal silicate complex includes divalent metal.

In accordance with yet another aspect, the present invention is directed to a process for waste water treatment, comprising adding monovalent cation silicate to waste water, wherein the waste water comprises divalent metal ions in an amount sufficient to combine with the monovalent cation silicate to form water-soluble metal silicate complex.

In one aspect, the divalent metal comprises at least one of magnesium, calcium, zinc, copper, iron(II), manganese(II), and barium, preferably at least one of magnesium and calcium.

In another aspect, the water-soluble metal silicate complex has a $SiO_2$ to monovalent cation oxide molar ratio of about 2 to 20, preferably about 3 to 5.

In still another aspect, the water-soluble metal silicate complex has a divalent metal to silicon molar ratio of about 0.001 to 0.25, preferably about 0.01 to 0.2.

In yet another aspect, the aqueous composition has a concentration of $SiO_2$ of about 0.01 to 5 wt %, preferably about 0.1 to 2 wt %.

In still another aspect, the water-soluble metal silicate complex has a particle size of less than about 200 nm.

In another aspect, the water-soluble metal silicate complex comprises a water-soluble silicate in accordance with the following formula:

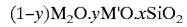
$$(1-y)M_2O \cdot yM'O \cdot xSiO_2$$

wherein M is monovalent cation; M' is divalent metal ion; x is from about 2 to 4; y is from about 0.005 to 0.4; and y/x is from about 0.001 to 0.25.

In one aspect, M comprises sodium, potassium, lithium, or ammonium, and preferably sodium.

In another aspect, M' comprises calcium or magnesium.

In yet another aspect, the water-soluble metal silicate complex comprises a water-soluble silicate in accordance with the following formula:

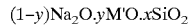
$$(1-y)Na_2O \cdot yM'O \cdot xSiO_2$$

where
M' is divalent metal ion comprising calcium or magnesium,
x is from about 2 to 4,
y is from about 0.005 to 0.4,
y/x is from about 0.001 to 0.25,
x/(1−y) is from about 2 to 20, and
the aqueous composition has a concentration of $SiO_2$ of about 0.01 to 5 wt %. Preferably, y/x is from about 0.01 to 0.2, x/(1−y) is from about 3 to 10, and the aqueous composition has a concentration of $SiO_2$ of about 0.1 to 2 wt %. Most preferably, y/x is from about 0.025 to 0.15, x/(1−y) is from about 3 to 5, and the aqueous composition has a concentration of $SiO_2$ of about 0.25 to 1.5 wt %.

In another aspect, the monovalent cation silicate comprises at least one of sodium silicate, potassium silicate, lithium silicate, and ammonium silicate, preferably sodium silicate, such as sodium silicate having a weight ratio of $SiO_2/Na_2O$ of about 2 to 4.

In another aspect, the divalent metal ions comprise at least one of magnesium and calcium.

In still another aspect, the water-soluble metal silicate complex is prepared by adding monovalent cation silicate to an aqueous reactant composition having a sufficient amount of divalent metal ions to form the water-soluble metal silicate complex.

In yet another aspect, the aqueous reactant composition having a sufficient amount of divalent metal ions has a hardness of about 1 to 600 ppm Ca equivalent. For instance, the aqueous reactant composition may comprise at least one of tray water, hard water, and treated water which treated water is prepared by increasing or decreasing hardness.

In another aspect, a source of the divalent metal ions comprises at least one of $CaCl_2$, $MgCl_2$, $MgSO_4$, $Ca(NO_3)_2$, $Mg(NO_3)_2$, $CaSO_4$, and $ZnSO_4$.

In yet another aspect, the water-soluble metal silicate complex is prepared by adding divalent metal ions to an aqueous reactant composition having a sufficient amount of monovalent cation silicate to form the water-soluble metal silicate complex.

In one aspect, the aqueous reactant composition having a sufficient amount of monovalent cation silicate has a concentration of $SiO_2$ of about 0.01 to 30 wt %.

In another aspect, the water-soluble metal silicate complex is added to cellulose slurry after a last high shear stage and before a headbox.

In yet another aspect, at least one additive comprising one of flocculent, starch, and coagulant, is added to the cellulose slurry. For instance, the at least one additive may be cationic polyacrylamide copolymer. The at least one additive may be added to the cellulose slurry at a point before a last high shear stage.

In another aspect, the water-soluble metal silicate complex comprises a water-soluble silicate in accordance with the following formula:

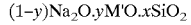

where

M' is divalent metal ion comprising calcium or magnesium, x is from about 2 to 4, y is from about 0.005 to 0.4, y/x is from about 0.001 to 0.25, x/(1−y) is from about 2 to 20, the aqueous composition has a concentration of $SiO_2$ of about 0.01 to 5 wt %, and at least one of flocculent, starch, and coagulant is added to the cellulose slurry.

DETAILED DESCRIPTION OF THE INVENTION

The particulars shown herein are by way of example and for purposes of illustrative discussion of the various embodiments of the present invention only and are presented in the cause of providing what is believed to be the most useful and readily understood description of the principles and conceptual aspects of the invention. In this regard, no attempt is made to show details of the invention in more detail than is necessary for a fundamental understanding of the invention, the description making apparent to those skilled in the art how the several forms of the invention may be embodied in practice.

All percent measurements in this application, unless otherwise stated, are measured by weight based upon 100% of a given sample weight. Thus, for example, 30% represents 30 weight parts out of every 100 weight parts of the sample.

Unless otherwise stated, a reference to a compound or component, includes the compound or component by itself, as well as in combination with other compounds or components, such as mixtures of compounds.

Before further discussion, the following terms will be discussed to aid in the understanding of the present invention.

"Hardness" refers to the total concentration of divalent metal ions or their salts in water, e.g., calcium, magnesium, calcium carbonate, and calcium chloride. Hardness may be measured in parts per million of Ca equivalents. In this regard, 1 ppm Ca equivalent is equal to 2.78 ppm $CaCl_2$ equivalent which is equal to 2.50 ppm $CaCO_3$ equivalent and which is equal to 0.61 ppm Mg equivalent.

"Water-soluble" and "stability" refer to the ability of the metal silicate complexes of the present invention to remain in solution. When the water-soluble metal silicate complexes of the present invention are formed, the process may be controlled so that no precipitate is formed. However, under some circumstances, a slight amount of precipitate may form. If the metal silicate complexes form precipitate, they are no longer complexes, but are metal silicate precipitate. In the present invention, it is desired that the metal silicate complexes of the present invention remain in solution and do not form a precipitate. It is noted that some of the water-soluble metal silicate complex may precipitate with time, however, it is preferred that no precipitate or a minimal amount of precipitate is formed. As long as the metal silicate complexes are water-soluble, the solutions should be essentially colorless and clear. In this regard, the water-soluble metal silicate complexes of the present invention are not visible to the naked eye. In particular, considering that turbidity depends on concentration, an aqueous composition of the water-soluble metal silicate complex of the present invention having a concentration of 0.3 wt % of $SiO_2$, in the absence of other materials that affect turbidity, would preferably have a turbidity of less than about 70 NTU, more preferably less than about 50 NTU, and most preferably less than about 20 NTU. The water-soluble metal silicate complexes of the present invention cannot be separated from the aqueous phase by most physical or mechanical separation techniques, such as centrifugation, sedimentation, or filtration.

"Cellulose slurry" refers to a water-based slurry containing cellulose fibers and fines, and which may contain other additives.

"Paper slurry" or "paper furnish" refers to a water-based slurry containing cellulose fibers and/or fines, such as of wood, vegetable, and/or cotton, and which may contain other additives for papermaking such as fillers, e.g., clay and precipitated calcium carbonate.

"Copolymer" refers to a polymer comprising two or more different kinds of monomers.

As an overview, the present invention relates to water-soluble metal silicate complexes, such as metal silicate complexes containing at least one divalent metal. The present invention is also directed to processes for preparing water-soluble metal silicate complexes. The present invention further relates to waster water treatment processes using water-soluble metal silicate complexes. The present invention also relates to processes for making cellulose products, such as paper products, by adding at least one water-soluble metal silicate complex to a cellulose slurry, such as a paper slurry. Similarly, the present invention relates to processes for making cellulose products by adding at least one monovalent cation silicate to a cellulose slurry so as to form a water-soluble metal silicate complex in the cellulose slurry. By adding or forming a water-soluble metal silicate complex in a cellulose slurry, the present invention is capable of improving retention and drainage control in making cellulose products. The present invention is further directed to cellulose products, such as paper products, containing water-soluble metal silicate complexes.

The water-soluble metal silicate complexes of the present invention preferably contain at least one kind of divalent metal ion and at least one kind of monovalent cation.

Examples of divalent metal ions useful in the water-soluble metal silicate complexes of the present invention include, but are not limited to, ions of alkaline earth metals and transition metals. In particular, the divalent metal ions may include magnesium, calcium, zinc, copper, iron(II), manganese(II), and/or barium. Preferably, the divalent metal ions include magnesium, calcium, and/or zinc. Most preferably, the divalent metal ions include magnesium and/or calcium.

Examples of monovalent cations useful in the water-soluble metal silicate complexes of the present invention include, but are not limited to, ions of alkaline metals. In particular, the monovalent cations may be sodium, potassium, lithium, and/or ammonium. Preferably, the monovalent cations are sodium and/or potassium. Most preferably, the monovalent cations are sodium.

In a preferred embodiment of the present invention, the metal silicate complex is a magnesium silicate complex and/or a calcium silicate complex prepared by adding sodium silicate to an aqueous composition containing magnesium and/or calcium ions. Preferably, an aqueous composition of the water-soluble metal silicate complex of the present invention comprises $SiO_2$ in an amount of about 0.01 to 5 wt % by weight of the aqueous composition, has a $SiO_2$/monovalent cation oxide, such as $Na_2O$, molar ratio from about 2 to 20, and a [(divalent metal, e.g., Mg+Ca)/Si] molar ratio from about 0.001 to 0.25.

Not wishing to be bound by theory, the water-soluble metal silicate complexes of the present invention are believed to include water-soluble metal silicate complexes having the following formula:

$$(1-y)M_2O \cdot yM'O \cdot xSiO_2 \qquad \text{formula (1)}$$

where:
M is a monovalent cation, such as those discussed above,
M' is a divalent metal ion, such as the divalent metal ions discussed above,
x is preferably from about 2 to 4,
y is preferably from about 0.005 to 0.4, and
y/x is preferably from about 0.001 to 0.25.

The ability of the metal silicate complexes of the present invention to remain in solution, i.e., the stability of the metal silicate complexes, is important to achieving the results of the present invention. For instance, stability is important with respect to improving retention and drainage control in cellulose products making. In particular, the metal silicate precipitates which may be formed have low or no activity with respect to retention and drainage control. In some cases, the metal silicate complexes have a slight precipitate and still demonstrate reasonable retention and drainage activity, because an insignificant portion of the metal silicate complexes are converted to precipitate and the majority of the components remain water-soluble. As discussed above, an aqueous composition of the water-solubility complex of the present invention having $SiO_2$ at a concentration of 0.3 wt %, in the absence of other materials that affect turbidity, would preferably have a turbidity of less than about 70 NTU, more preferably less than about 50 NTU, and most preferably less than about 20 NTU.

The ability of the metal silicate complexes of the present invention to remain in solution, i.e., stability, generally depends upon several factors. These factors include molar ratio of $SiO_2/M_2O$, molar ratio of M'/Si, concentration of $SiO_2$, size of the microparticles of the complex, hardness of the aqueous composition in which the complexes are formed, agitation applied during formation of the metal silicate complexes, pH of the aqueous composition, temperature of the aqueous composition, and solutes in the aqueous composition. Of these factors, the most important are molar ratio of $SiO_2/M_2O$ and molar ratio of M'/Si. The ability of the metal silicate complexes to remain in solution depends upon an interaction of these factors, as discussed in more detail below.

Before discussing variables affecting the stability of the water-soluble metal silicate complexes involved in the process of making the water-soluble metal silicate complexes, a discussion of stability factors which are specific to the complexes themselves is as follows. The factors affecting the stability of the metal silicate complexes which are specific to the metal silicate complexes per se of the present invention include molar ratio of $SiO_2/M_2O$, molar ratio of M'/Si, and size of the microparticles forming the complexes.

The water-soluble metal silicate complexes of the present invention preferably have an $SiO_2/M_2O$ molar ratio, i.e., x:(1−y) for compounds in accordance with formula (1), in the range from about 2 to 20, more preferably from about 3 to 10, and most preferably from about 3 to 5. When this value is too high, the metal silicate complex could form a precipitate and lose activity. When this value is too low, a relatively small amount of metal silicate complex is formed.

The water-soluble metal silicate complexes of the present invention preferably have an M'/Si molar ratio, i.e., y:x for compounds in accordance with formula (1), in the range from about 0.001 to 0.25, preferably from about 0.01 to 0.2, and more preferably 0.025 to 0.15. When this value is too high, the metal silicate complex could form a precipitate and lose activity. When this value is too low, a relatively small amount of metal silicate complex is formed.

It is expected that the water-soluble metal silicate complexes of the present invention have a microparticle size preferably less than about 200 nm, with a range of preferably about 2 to 100 nm, and more preferably about 5 to 80 nm, as measured by dynamic light scattering at 25° C. in aqueous solution. It is believed that if the particle size is too large, the metal silicate complexes will form precipitate. If the particle size is too small, the metal silicate complexes will not have enough flocculating power.

Before discussing variables of making the metal silicate complexes which affect the stability of the water-soluble metal silicate complexes of the present invention, an overview of the process of making the water-soluble metal silicate complexes of the present invention is presented.

The water-soluble metal silicate complexes of the present invention can be prepared by adding at least one monovalent cation silicate to an aqueous composition containing divalent metal ions. When at least one monovalent cation silicate is mixed with an aqueous composition containing divalent metal ions, the water-soluble metal silicate complexes are spontaneously formed during mixing of the monovalent cation silicates and the aqueous composition. The water-soluble metal silicate complexes of the present invention may also be prepared by providing an aqueous composition comprising at least one monovalent cation silicate and simultaneously and/or subsequently adding a source of divalent metal ions to form the water-soluble metal silicate complex of the present invention. The water-soluble metal silicate complexes of the present invention can be formed as a concentrate in an off-site factory or may be prepared on-site, e.g., at a paper mill.

The monovalent cation silicates which are used to form the water-soluble metal silicate complexes of the present invention can be in the form of a powder or a liquid. Examples of the monovalent cation silicates which are used to form the water-soluble metal silicate complexes include silicates of alkaline metals. Particularly preferred examples of silicates for making the water-soluble metal silicate complexes of the present invention include sodium silicate, potassium silicate, lithium silicate, and/or ammonium silicate.

As discussed above, examples of divalent metal ions useful in making the water-soluble metal silicate complexes of the present invention include, but are not limited to, alkaline earth metals and transition metals. In particular, the divalent metal ions may be magnesium, calcium, zinc, copper, iron(II), manganese(II), and/or barium.

Examples of aqueous compositions having divalent metal ions include, but are not limited to, tray water, hard water, treated water, and cellulose slurry. "Tray water" which is also known as "silo water" refers to water collected from a cellulose product machine during cellulose product making, e.g., water collected from a paper machine during and after papermaking. "Hard water" refers to water containing a substantial amount of metal ions, such as $Mg^{2+}$ and/or $Ca^{2+}$ ions. "Treated water" refers to hard or soft water which has been treated to increase or decrease hardness. If the water hardness is too high, as discussed below, some of the metal ions may be blocked or deactivated by any known manner, such as by adding chelating agent, e.g., ethylenediaminetetraacetic acid (EDTA), hydroxyethylethlenediaminetriacetic acid (HEDTA), tartaric acid, citric acid, gluconic acid, polyacrylic acid. If the water hardness is too low, as discussed below, divalent metal ions may be added. For instance, magnesium and/or calcium salt can be added to increase metal ions, and thus increase water hardness. In particular, $CaCl_2$, $MgCl_2$, $MgSO_4$, $Ca(NO_3)_2$, $Mg(NO_3)_2$, $CaSO_4$, and/or $ZnSO_4$, preferably $CaCl_2$, $MgCl_2$, and/or $ZnSO_4$, more preferably $CaCl_2$ and/or $MgCl_2$, can be added to the aqueous composition to increase the concentration of metal ions.

With the above in mind, several variables of the process of making the water-soluble complexes affect the ability of the metal silicate complexes to remain in solution. These process variables include concentration of $SiO_2$ in the aqueous composition, hardness of the aqueous composition, agitation applied during formation of the water-soluble metal silicate complexes, pH of the aqueous composition, temperature of the aqueous composition, and additional solutes in the aqueous composition. Of these variables, the concentration of $SiO_2$ in the aqueous composition and the hardness of the aqueous composition are the most important.

When a monovalent cation silicate is combined with a divalent metal ion to form an aqueous composition comprising the water-soluble metal silicate complexes of the present invention, the resulting aqueous composition preferably has a concentration of $SiO_2$ of about 0.01 to 5 wt %, more preferably from about 0.1 to 2 wt %, and most preferably from about 0.25 to 1.5 wt %, by weight of the aqueous composition. When this value is too high, the metal silicate complex could form a precipitate and lose activity. When this value is too low, the solution is not economical because a large amount of solution is required.

When divalent metal ions are added to an aqueous composition comprising monovalent cation silicate, the aqueous composition preferably has a concentration of $SiO_2$ of about 0.01 to 30 wt %, more preferably from about 0.1 to 15 wt %, and most preferably from about 0.25 to 10 wt %, by weight of the aqueous composition. When this value is too high, the metal silicate complex could form a precipitate and lose activity. When this value is too low, the composition is not economical because a large amount of the aqueous composition is required.

When monovalent cation silicate is added to an aqueous composition having divalent metal ions, the aqueous composition of the present invention preferably has a hardness from about 1 to 600 ppm Ca equivalent, more preferably from about 10 to 200 ppm Ca equivalent, and most preferably from about 20 to 100 ppm Ca equivalent. If the hardness is too high, the metal silicate complex may precipitate. If the hardness is too low, the water-soluble metal silicate complex may not form.

Agitation applied during formation of the metal silicate complexes also affects the ability of the metal silicate complexes to remain in solution. If no agitation is applied, under some circumstances, the water-soluble complex of the present invention may locally precipitate due to overconcentration. The effect of agitation, however, is difficult to quantify. The amount of agitation depends upon such factors as the amount and viscosity of the solution, size of the container, size and type of stirrer bar or propeller, rotation speed of stirrer or mixer, and so on. For example, in laboratory preparation, when a 100 ml of a metal silicate complex solution in a 200 ml beaker is mixed using a 1" stirrer bar on a MIRAK™ Magnetic Stirrer (Model #L SO&3235-60, Bernstead Thermolyne Corporation, 2555 Kerper Blvd., Dubuque, Iowa 52004), 300 rpm or higher mixing speed should be proper. In general, as long as possible, agitation should be maximized. However, if agitation is too high, it may not be economical due to overconsumption of energy, or it may cause vibration of the equipment or split of the solution.

Although the pH of the aqueous composition is expected to be an important factor in the ability of the metal silicate complexes to remain in solution, the precise effect of the pH has not been studied. However, the present invention has been found to work with tray to water as an example. Tray water typically has a pH from about 6 to 10, more typically from about 7 to 9, and most typically from about 7.5 to 8.5.

The temperature of the aqueous composition is preferably about 5 to 95° C., more preferably about 10 to 80° C., and most preferably about 20 to 60° C. For instance, tray water in the paper machine is typically warm and typically has a temperature from about 10 to 60° C., more typically from about 30 to 60° C., and most typically from about 45 to 55° C. Thus, the metal silicate complexes may be formed at ambient temperature. At lower M'/Si ratio, increasing the temperature will accelerate the formation of the metal silicate complexes. At higher M'/Si ratio, the temperature has little effect.

Another factor which is expected to affect the ability of the metal silicate complexes to remain in solution is the presence of solutes in the aqueous composition. In other words, it is expected that the presence of counterions would affect the stability of the metal silicate complexes.

The present invention is also directed to processes for preparing cellulose slurries, such as paper slurries, and to processes of making cellulose products, such as paper. In particular, the above-noted water-soluble metal silicate complexes of the present invention may be added to a cellulose slurry. Further, the processes for preparing cellulose slurries and products of the present invention may involve adding at least one of the above-noted monovalent cation silicates to a cellulose slurry containing at least one kind of the above-noted divalent metal ions.

The cellulose slurries of the present invention may contain fillers, such as those known in the art, such as clay, titanium dioxide, ground calcium carbonate, or precipitated calcium carbonate. The pH and temperature of the cellulose slurry are not considered to be important factors in the present invention. As long as the pH and temperature of the cellulose slurry are under normal conditions, such as pH in a range of about 4 to 10 and temperature of about 5 to 80° C., the water-soluble metal silicate complexes of the present invention are expected to be effective.

When a monovalent cation silicate is added to the cellulose slurry to form a water-soluble metal silicate complex in situ, the cellulose slurry of the present invention preferably has a hardness from about 1 to 600 ppm (part per million) Ca equivalent, more preferably from about 10 to 200 ppm Ca equivalent, and most preferably from about 20 to 100 ppm Ca equivalent. If the cellulose slurry has a hardness from about 1 to 600 ppm Ca equivalent, the monovalent cation silicate can react with the divalent metal ions in the cellulose slurry and form the water-soluble metal silicate complex of the present invention.

The monovalent cation silicate or water-soluble metal silicate complex of the present invention is preferably added to the cellulose slurry at a point after the last high shear stage, but before the headbox, to avoid having the flocs formed subjected to excessive shear forces.

According to the present invention, the water-soluble metal silicate complex or the monovalent cation silicate is preferably added at a dosage from about 0.1 to 20 lb/ton, more preferably from about 0.5 to 6 lb/ton, most preferably about 1 to 4 lb/ton, based on $SiO_2$ and the dry weight of the cellulose slurry.

In addition, at least one additive can be added to the cellulose slurry in conjunction with the water-soluble metal silicate complex of the present invention. For example, the at least one additive may include substantially any additive which is used for papermaking. Examples of the additives include, but are not limited to, flocculant, cationic starch, coagulant, sizing agent, wet strength agent, dry strength agent, and other retention aids.

The order of addition of the at least one additive and water-soluble silicate, i.e., the water-soluble metal silicate complex and/or the monovalent cation silicate, to the cellulose slurry is not critical. However, the water-soluble silicate is preferably added to the cellulose slurry after addition of the at least one additive. For instance, the water-soluble silicate may be added to the cellulose slurry after addition of flocculent. Preferably, flocculent is added at a point before the last high shear stage, such as the pressure screen and cleaners, while the water-soluble silicate is added after the last high shear stage, but prior to the headbox.

When two or more additives are added to the cellulose slurry of the present invention, the preferred additives include flocculant and starch. The starch can be added to the cellulose slurry before or after the flocculent. Preferably, the starch is added before the flocculent.

When coagulant is added to the cellulose slurry in conjunction with a flocculant and/or starch, it can be added before or after the flocculant and/or starch.

According to the present invention, the flocculant can be either a synthetic or natural polymer that is cationic, anionic, or substantially nonionic. Preferably, the flocculent is cationic.

Examples of cationic flocculants include, but are not limited to, homopolymers or copolymers containing at least one cationic monomer selected from the following: dimethylaminoethylmethacrylate (DMAEM), dimethylaminoethylacrylate (DMAEA), methacryloyloxyethyltrimethylammonium chloride (METAC), dimethylaminopropylmethacrylate(DMAPMA), methacrylamidopropyl-trimethylammonium chloride (MAPTAC), dimethylaminopropylacrylamide (DMAPAA), acryloyloxyethyltrimethylammonium chloride (AETAC), dimethaminoethylstyrene, (p-vinylbenzyl)-trimethylammonium chloride, 2-vinylpyridine, 4-vinylpyridine, vinylamine, and the like. For example, the cationic flocculent may be a cationic polyacrylamide copolymer.

The molecular weight of the cationic flocculant is preferably from at least about 500,000, with a range of preferably about 2,000,000 to 15,000,000, more preferably about 4,000,000 to 12,000,000, and most preferably about 5,000,000 to 10,000,000.

The degree of cationic substitution for the cationic flocculant is preferably at least about 1 mol %, with a range of preferably about 5 to 50 mol %, even more preferably from about 10 to 30 mol %.

The potential charge densities for the cationic flocculant is preferably 0.1 to 4 meq/g, more preferably from about 0.5 to 3 meq/g, and most preferably about 1 meq/g to 2.5 meq/g.

In the cellulose product making process of the present invention, the dosage of the cationic flocculant is preferably about 0.1 to 4 lb/ton, more preferably about 0.2 to 2 lb/ton, and most preferably about 0.25 to 1 lb/ton, based on active ingredient of the flocculent and dry weight of the cellulose slurry.

Suitable anionic flocculants of the present invention can be homopolymers or copolymers containing anionic monomers selected from the following: acrylate, methacrylate, maleate, itaconate, sulfonate, phosphonate, and the like. For example, the anionic flocculant may be poly (acrylamide-co-acrylate).

The molecular weight of the anionic flocculants of the present invention is preferably at least about 500,000, with a range of preferably about 5,000,000 to 20,000,000, and more preferably from about 8,000,000 to 15,000,000.

The degree of anionic substitution for the anionic flocculant is preferably at least about 1 mol %, with a range of preferably about 10 to 60 mol %, more preferably about 15 to 50 mol %.

The potential charge densities for the anionic flocculant is preferably about 1 to 20 meq/g, more preferably about 2 to 8 meq/g, and most preferably about 2.5 to 6 meq/g.

In the cellulose product making process of the present invention, the dosage of the anionic flocculant is preferably about 0.1 to 4 lb/ton, more preferably about 0.2 to 2 lb/ton, and most preferably about 0.25 to 1 lb/ton, based on active ingredient of the flocculant and dry weight of the cellulose slurry.

Examples of the substantially nonionic flocculants of the present invention include, but are not limited to, polyacrylamide, poly(ethylene oxide), polyvinylalcohol, and poly(vinylpyrrolidinone), preferably polyacrylamide, poly(ethylene oxide), and polyvinylalcohol, and more preferably polyacrylamide and poly(ethylene oxide).

The molecular weight of the substantially nonionic flocculant is preferably at least about 500,000, with a range of preferably about 1,000,000 to 10,000,000, more preferably from about 2,000,000 to 8,000,000.

In the cellulose product making process of the present invention, the dosage of the substantially nonionic flocculant is preferably about 0.2 to 4 lb/ton, more preferably about 0.5 to 2 lb/ton, based on active ingredient of the flocculant and dry weight of the cellulose slurry.

As discussed above, cationic starch, including amphoteric starch, may also be added to the cellulose slurry of the present invention. Preferably, cationic starch is used in cellulose product making as a wet or dry strength additive. The cationic starch of the present invention preferably has a cationic charge substitution of at least about 0.01, with a range of preferably about 0.01 to 1, more preferably about 0.1 to 0.5. The cationic starch can be derived from a variety of plants, such as potato, corn, waxy maize, wheat, and rice.

The molecular weight of the starch is preferably about 1,000,000 to 5,000,000, more preferably about 1,500,000 to 4,000,000, and most preferably about 2,000,000 to 3,000,000.

The starch of the present invention can be added to the cellulose slurry at a point before or after the flocculant, preferably before the water-soluble silicate of the present invention. The preferred dosage for the starch is from about 1 to 50 lb/ton, more preferably from about 5 to 20 lb/ton, based on dry weight of the cellulose slurry.

Another additive that can be added to the cellulose slurry of the present invention is coagulant. Examples of coagulants of the present invention include, but are not limited to, inorganic coagulants, such as alum, or similar materials, such as aluminum chloride, polyaluminum chloride (PAC), polyaluminum sulfate (PAS), and polyaluminum sulfate silicate (PASS), or organic coagulants such as polyamines, poly(diallyl dimethyl ammonium chloride), polyethyleneimine, polyvinylamine, and the like, preferably the inorganic coagulants, and more preferably alum, or similar materials.

The molecular weight of the organic coagulant is preferably about 1000 to 1,000,000, more preferably about 2000 to 750,000, more preferably from about 5000 to 500,000.

The coagulant of the present invention can be added to the cellulose slurry at a point before or after the flocculent, preferably before the water-soluble silicate. The preferred dosage for the inorganic coagulant is from about 1 to 30 lb/ton, more preferably from about 5 to 20 lb/ton, based on dry weight of the cellulose slurry. The preferred dosage for the organic coagulant is 0.1 to 5 lb/ton, more preferably about 0.5 to 2 lb/ton.

The cellulose slurry of the present invention may be formed into cellulose products through any method. For example, after the addition or formation of the water-soluble metal silicate complex, and optionally the addition of at least one additive to a cellulose slurry, the cellulose slurry may be deposited on a papermaking wire, drained, dried, and pressed into a final cellulose product.

The resulting cellulose product comprises cellulose fiber and residue of at least one water-soluble metal silicate complex. Preferably, the amount of the residue in the cellulose product is about 50 to 10,000 ppm, more preferably about 250 to 3000, and most preferably about 500 to 2000 ppm, based on $SiO_2$.

Since retention and drainage aids typically finction as flocculating agents which are also useful in treating waste water, it is expected that the water-soluble metal silicate complexes of the present invention would also be used to treat waste water. To treat waste water, the water-soluble metal silicate complex would be added to the waste water to cause suspended particles to precipitate.

The water-soluble metal silicate complexes and processes of the present invention result in several advantages. In particular, the water-soluble metal silicate complexes and processes of the present invention yield significant improvements in retention and drainage while maintaining good formation of the cellulose sheet. The use of the complexes of the present invention as a drainage aid is beneficial in cellulose products making, especially when a large amount of drainage is required (e.g., at least about 76 lb/3300 sq. ft) where productivity would otherwise be reduced due to slow water drainage through relatively thick fibrous mats.

Thus, the water-soluble metal silicate complexes and processes of the present invention can be used to increase production rates. In this regard, the dewatering or drainage of the fibrous slurry on the wire or screen is often the limiting step in achieving higher product rates.

Increased dewatering can also result in a dryer cellulose sheet in the press and dryer sections, and thus can reduce steam consumption. The dryer section is also the stage in a cellulose products making process that determines many final sheet properties.

Similarly, when used as retention aids, the metal silicates of the present invention reduce the loss of fillers and fines, and thus reduce production costs. In addition, complexes of the present invention also provide excellent paper formation due to proper drainage and retention.

Further, the process of preparing the water-soluble metal silicate complexes of the present invention is simple and does not require any special manufacturing process.

Without further elaboration, it is believed that one skilled in the art can, using the preceding description, utilize the present invention to its flillest extent. The present invention will be further illustrated by way of the following Examples. These examples are non-limiting and do not restrict the scope of the invention.

Unless stated otherwise, all percentages, parts, etc. presented in the examples are by weight.

EXAMPLES

Examples 1–17 below are directed to water soluble metal (Ca or/and Mg) silicate complexes prepared by mixing a liquid sodium silicate into various aqueous solution containing Ca or/and Mg ions. The aqueous solution was either a $CaCl_2$ solution, $MgCl_2$ solution or hard water. The Ca or Mg solutions containing either Ca or Mg ions were prepared by diluting concentrated $CaCl_2$ or $MgCl_2$ solution with deionized water. Ca/Mg solutions containing both Ca and Mg ions were prepared by mixing hard water having a hardness of 136 ppm Ca equivalent with deionized water.

Unless otherwise specified, the following examples were prepared by mixing the liquid sodium silicate with an aqueous solution continuously for about 30 minutes. The aqueous solution can be either a $CaCl_2$ solution or $MgCl_2$ solution or fresh hard water. The resulting solutions were then allowed to stand for at least about 3 hours before drainage and retention tests were conducted.

The liquid sodium silicates used in the following examples are listed in Table 1 below. In Table 1, the manufacturer for A was The PQ Corporation (P.O. Box 840, Valley Forge, Pa. 19482-0840) and B was OxyChem, Occidental Chemical Corporation (Occidental Tower, 5005 LBJ Freeway, Dallas, Tex. 75380-9050).

Ca or Mg solutions containing either Ca or Mg ions used in the following examples were prepared by diluting concentrated $CaCl_2$ or $MgCl_2$ solutions with deionized water.

$CaCl_2$ and $MgCl_2$ used in the following examples were manufactured by Tetra Technologies, Inc. (25025 I-45 North, The Woodlands, Tex. 77380).

TABLE 1

| Product Name | Supplier* | Wt. Ratio $SiO_2/Na_2O$ | % $SiO_2$ | % $Na_2O$ |
|---|---|---|---|---|
| STIXSO RR | A | 3.25 | 30.0 | 9.22 |
| Sodium Silicate, E | A | 3.22 | 27.7 | 8.6 |
| Sodium Silicate, N | A | 3.22 | 28.7 | 8.9 |
| Sodium Silicate, O | A | 3.22 | 29.5 | 9.15 |
| Sodium Silicate, grade 40 | B | 3.22 | 29.2 | 9.1 |
| Sodium Silicate, grade 42 | B | 3.22 | 30.0 | 9.3 |
| Sodium Silicate, K | A | 2.88 | 31.7 | 11.0 |
| Sodium Silicate, M | A | 2.58 | 32.1 | 12.45 |
| Sodium Silicate, D | A | 2.0 | 29.4 | 14.7 |

Canadian Standard Freeness (CSF) Test

Canadian Standard Freeness (CSF) test was used to evaluate the drainage activity of the Ca or/and Mg silicate complexes in the examples below (e.g., Examples 1–13 and 15–17). Unless specified, the CSF drainage test was conducted on a paper furnish of 1,000 ml. The paper furnish has a 0.3 wt % consistency, and contains 80 wt % fibers and 20 wt % precipitated calcium carbonate (PCC) filler by weight of the total dry furnish. The fibers used in the paper furnish was a 70/30 blend of hardwood/softwood. The hardwood fiber was a bleached chemical pulp of St. Croix Northern Hardwood, manufactured by Ekman and Company (STE 4400, 200 S, Biscayne Blvd., Miami, Fla. 33130) The softwood fiber was a bleached chemical pulp of Georgianier Softwood, manufactured by Rayonier (4470 Savannan HWY, Jessup, Ga.). The PCC was Albacar 5970 manufactured by Specialty Minerals (230 Columbia Street, Adams, Mass. 01220).

The pH of the paper furnish was from 8.0 to 8.9. The temperature of the paper furnish was from 21° C. to 25° C. The fibers used in the paper furnish was a 70/30 blend of hardwood/softwood. The CSF drainage test was performed by mixing 1000 ml of the paper furnish in a squared beaker at ambient temperature (unless specified) and at 1200 rpm mixing speed. The paper furnish contains silicate complex or control samples and optional additives.

In the following examples, the paper furnish can be pretreated prior to the addition of a silicate complex, sodium silicate or water by adding additives to the paper furnish. The paper furnish was then transferred to a CSF device so that drainage rate was measured.

The additives used in the drainage test were cationic starch, alum, and flocculants. The cationic starch was Sta-Lok 600™ (obtained from A. E. Staley Manufacturing Company). The flocculants were either cationic or anionic in nature. The cationic flocculant was a cationic modified polyacrylamide (CPAM) having a molecular weight of about 6,000,000 and a cationic charge of 10 mol. %. CPAM was PC8695, Novus 8910, or PC8138 manufactured by Hercules Incorporated. (Wilmington, Del.).

The anionic flocculant was an anionic modified polyacrylamide (APAM) having a molecular weight of about 20,000,000 and an anionic charge of about 30 mol. %. APAM was PA8130 manufactured by Hercules Incorporated. (Wilmington, Del.).

The alum was a liquid aluminum sulfate containing 48.5 wt % based on dry solid of $Al_2(SO_4).14H_2O$ (obtained from General Chemical Corporation of 90 East Halsey Road, Parsippany, N.J. 07054).

The unit used to determine the amount of the additives in the examples are in #/T (lb/ton) based on the dry weight of the paper furnish. The amount of starch and alum used was based on dry product. The amount of cationic and anionic flocculent used were based on active solids. The amount of the metal silicates used was based on dry weight of $SiO_2$ or as dry weight of sodium silicate.

The addition of each additive, water soluble metal silicate complex, metal silicate, and comparative sample (e.g., bentonite) to a paper furnish were in the following order: cationic starch, alum, flocculant, and water soluble metal silicate complex or metal silicate or comparative sample (e.g., bentonite).

The mixing time for cationic starch and alum was 10 seconds. For flocculent, the mixing time was either 10 seconds or 60 seconds as specified in the example. The mixing time for the water soluble metal silicate complex or metal silicate or comparative sample was 10 seconds.

Britt Jar Fines Retention Test

Britt Jar fines retention test was conducted to evaluate retention performance of the Ca/Mg silicate complexes (e.g., Example 14). The paper furnish used in the retention test has the same solid composition as those in the CSF drainage test with an exception of having a consistency was 0.5 wt %. During the test, a 500 ml of the furnish was mixed in a Britt Jar and treated with various additives in the same experimental conditions as in the drainage test.

After the treatments were completed, the first 100 ml effluent from the jar was collected for the analysis of retention rate.

Example 1

A control test sample (Test No. 1 shown in Table 2 below) was prepared by adding 10#/T of cationic starch, 5 #/T of alum, and 1 #/T of CPAM (PC 8695) to a paper furnish.

A Sodium Silicate O sample (Test No. 2 shown in Table 2 below) was prepared by diluting Sodium Silicate O to 0.3 wt % $SiO_2$ by adding 1.02 g of liquid Sodium Silicate O to 98.98 g of deionized water. 2 #/T of the diluted Sodium Silicate O was added to a pretreated paper furnish. The paper furnish has been pretreated with 10#/T of cationic starch, 5 #/T of alum, and 1 #/T of CPAM (PC 8695).

Five Ca silicate complexes and five Mg silicate complexes (Test Nos. 3–12 shown in Table 2 below) containing 0.3 wt % $SiO_2$ and having Ca/Si or Mg/Si molar ratios shown in Table 2 were used in this example. Each of the silicate complexes was prepared as follows:

For Test No. 3 shown in Table 2, the Ca silicate complex was prepared by mixing 1.017 g of Sodium Silicate O with 98.98 g of $CaCl_2$ solution containing 100 ppm Mg equivalent. 2 #/T of the silicate complex was added to a pretreated paper furnish. The paper furnish has been pretreated with 10#/T of cationic starch, 5 #/T of alum, and 1 #/T of CPAM (PC 8695).

For Test No. 4 shown in Table 2, the Ca silicate complexes was prepared by mixing 1.017 g of Sodium Silicate O with 98.98 g of $CaCl_2$ solution containing 150 ppm Mg equivalent. 2 #/T of the silicate complex was added to a pretreated paper furnish. The paper furnish has been pretreated with 10#/T of cationic starch, 5 #/T of alum, and 1 #/T of CPAM (PC 8695).

For Test No. 5 shown in Table 2, the Ca silicate complexes was prepared by mixing 1.017 g of Sodium Silicate O with 98.98 g of $CaCl_2$ solution containing 200 ppm Mg equivalent. 2 #/T of the silicate complex was added to a pretreated paper furnish. The paper furnish has been pretreated with 10#/T of cationic starch, 5 #/T of alum, and 1 #/T of CPAM (PC 8695).

For Test No. 6 shown in Table 2, the Ca silicate complexes was prepared by mixing 1.017 g of Sodium Silicate O with 98.98 g of $CaCl_2$ solution containing 300 ppm Mg equivalent. 2 #/T of the silicate complex was added to a pretreated paper furnish. The paper furnish has been pretreated with 10#/T of cationic starch, 5 #/T of alum, and 1 #/T of CPAM (PC 8695).

For Test No. 7 shown in Table 2, the Ca silicate complexes was prepared by mixing 1.017 g of Sodium Silicate O with 98.98 g of CaCl$_2$ solution containing 400 ppm Mg equivalent. 2 #/T of the silicate complex was added to a pretreated paper furnish. The paper furnish has been pretreated with 10#/T of cationic starch, 5 #/T of alum, and 1 #/T of CPAM (PC 8695).

For Test No. 8 shown in Table 2, the Ca silicate complexes was prepared by mixing 1.017 g of Sodium Silicate O with 98.98 g of MgCl$_2$ solution containing 100 ppm Mg equivalent. 2 #/T of the silicate complex was added to a pretreated paper furnish. The paper furnish has been pretreated with 10#/T of cationic starch, 5 #/T of alum, and 1 #/T of CPAM (PC 8695).

For Test No. 9 shown in Table 2, the Ca silicate complexes was prepared by mixing 1.017 g of Sodium Silicate O with 98.98 g of MgCl$_2$ solution containing 200 ppm Mg equivalent. 2 #/T of the silicate complex was added to a pretreated paper furnish. The paper furnish has been pretreated with 10#/T of cationic starch, 5 #/T of alum, and 1 #/T of CPAM (PC 8695).

For Test No. 10 shown in Table 2, the Ca silicate complexes was prepared by mixing 1.017 g of Sodium Silicate O with 98.98 g of MgCl$_2$ solution containing 300 ppm Mg equivalent. 2 #/T of the silicate complex was added to a pretreated paper furnish. The paper furnish has been pretreated with 10#/T of cationic starch, 5 #/T of alum, and 1 #/T of CPAM (PC 8695).

For Test No. 11 shown in Table 2, the Ca silicate complexes was prepared by mixing 1.017 g of Sodium Silicate O with 98.98 g of MgCl$_2$ solution containing 400 ppm Mg equivalent. 2 #/T of the silicate complex was added to a pretreated paper furnish. The paper furnish has been pretreated with 10#/T of cationic starch, 5 #/T of alum, and 1 #/T of CPAM (PC 8695).

For Test No. 12 shown in Table 2, the Ca silicate complexes was prepared by mixing 1.017 g of Sodium Silicate O with 98.98 g of MgCl$_2$ solution containing 500 ppm Mg equivalent. 2 #/T of the silicate complex was added to a pretreated paper furnish. The paper furnish has been pretreated with 10#/T of cationic starch, 5 #/T of alum, and 1 #/T of CPAM (PC 8695).

The final paper furnishes of Test Nos. 1–12 were then transferred to a CSF device so that drainage rates were measured. The results of the samples are summarized in Table 2 below.

TABLE 2

| Test No. | Sample I.D. | M'/Si Molar ratio | Silicate addition (#/T as SiO$_2$) | CSF (ml) |
|---|---|---|---|---|
| 1 | Control | | 0 | 440 |
| 2 | Na Silicate | 0 | 2 | 530 |
| 3 | Ca Silicate | 0.018 | 2 | 613 |
| 4 | Ca Silicate | 0.027 | 2 | 610 |
| 5 | Ca Silicate | 0.036 | 2 | 590 |
| 6 | Ca Silicate | 0.054 | 2 | 580 |
| 7 | Ca Silicate | 0.072 | 2 | 570 |
| 8 | Mg Silicate | 0.021 | 2 | 630 |
| 9 | Mg Silicate | 0.042 | 2 | 635 |
| 10 | Mg Silicate | 0.063 | 2 | 645 |

TABLE 2-continued

| Test No. | Sample I.D. | M'/Si Molar ratio | Silicate addition (#/T as SiO$_2$) | CSF (ml) |
|---|---|---|---|---|
| 11 | Mg Silicate | 0.084 | 2 | 635 |
| 12 | Mg Silicate | 0.105 | 2 | 630 |

Table 2 illustrates that Ca and Mg silicate complexes having a Ca/Si molar ratio ranging from 0.018 to 0.072 or Mg/Si molar ratio ranging from 0.021 to 0.105 significantly improve drainage properties of the paper furnish. In addition, Table 2 shows that when the Ca/Si molar ratio of the Ca silicate complex was at least 0.036, the silicate complex form a precipitate that was visible to the naked eye (such as the samples in the Test Nos. 5 to 7), and thus drainage activity was decreased.

Table 2 also illustrates that the addition of Na silicate to the paper furnish aids in the increase of drainage rate of the paper furnish.

All the solutions containing the silicated complexes of the present invention were clear solutions with the exception of the solutions of Test Nos. 5–7 which contain a small amount of precipitate visible to the naked eye. Thus, all of the silicate complexes resulting from Example 1 were water soluble with the exception of Test Nos. 5–7 which yield a small amount of precipitate.

Example 2

A control sample (Test No. 1 shown in Table 3 below) was prepared by adding to a paper furnish 10 #/T of cationic starch, 5 #/T of alum, and 0.5 #/T of CPAM (PC8138).

A sample (Test No. 2 shown in Table 3 below) containing a commercial microparticle drainage aid, bentonite, was also included in this example. The bentonite used in this example was Bentolite HS and supplied by Southern Clay Products, Inc. The bentonite was added to a paper furnish that has been pretreated with 10 #/T of cationic starch, 5 #/T of alum, and 0.5 #/T of CPAM (PC8138). The amount of bentonite added was 2#/T based on solid weight.

A Na Silicate N sample (Test No. 3 shown in Table 3 below) containing no Ca or Mg ions was also prepared. 2.01 g of Na Silicate N was diluted with 248 g of deionized water to a concentration of 0.3 wt % and continuously mixed for 1 minute. The diluted Na silicate was then immediately added to a paper furnish that has been pretreated with 10 #/T of cationic starch, 5 #/T of alum, and 0.5 #/T of CPAM (PC8138). The amount of the added Na Silicate N was 2#/T of based on dry solid weight.

Seven Ca silicate complexes and four Mg silicate complexes (Test Nos. 4–14 shown in Table 3 below) containing 0.3 wt % sodium silicate solid and having various M'/Si molar ratios as shown in Table 3 were prepared as follows:

For Test No. 4 shown in Table 3, the Ca silicate complex was prepared by first adding 0.313 g of 2% CaCl$_2$ solution to 247.68 g of deionized water, and subsequently adding 2.01 g Sodium Silicate N to the deionized water. The mixtures were continuously mixed on a magnetic stirrer for 1 minute. 2#/T of the silicate complex was immediately added to a pretreated paper furnish for drainage rate measurement. (The amount of the silicate complex was 2#/T by solid weight of sodium silicate.) The pretreated furnish was prepared by adding the following additives to the paper furnish in the following order: 10 #/T of cationic starch, 5 #/T of alum, and 0.5 #/T of CPAM (PC8138). Each additive except CPAM (PC8138) was mixed for 10 seconds. CPAM (PC8138) was mixed for 60 seconds.

For Test No. 5 shown in Table 3, the Ca silicate complex was prepared by first adding 0.625 g of 2% $CaCl_2$ solution to 247.37 g of deionized water, and subsequently adding 2.01 g Sodium Silicate N to the deionized water. The mixtures were continuously mixed on a magnetic stirrer for 1 minute. 2#/T of the silicate complex was immediately added to a pretreated paper furnish for drainage rate measurement. The pretreated furnish was prepared by adding the following additives to the paper furnish in the following order: 10 #/T of cationic starch, 5 #/T of alum, and 0.5 #/T of CPAM (PC8138). Each additive except CPAM (PC8138) was mixed for 10 seconds. CPAM (PC8138) was mixed for 60 seconds.

For Test No. 6 shown in Table 3, the Ca silicate complex was prepared by first adding 1.25 g of 2% $CaCl_2$ solution to 246.74 g of deionized water, and subsequently adding 2.01 Sodium Silicate N to the deionized water. The mixtures were continuously mixed on a magnetic stirrer for 1 minute. 2#/T of the silicate complex was immediately added to a pretreated paper furnish for drainage rate measurement. The pretreated furnish was prepared by adding the following additives to the paper furnish in the following order: 10 #/T of cationic starch, 5 #/T of alum, and 0.5 #/T of CPAM (PC8138). Each additive except CPAM (PC8138) was mixed for 10 seconds. CPAM (PC8138) was mixed for 60 seconds.

For Test No. 7 shown in Table 3, the Ca silicate complex was prepared by first adding 1.875 g of 2% $CaCl_2$ solution to 246.12 g of deionized water, and subsequently adding 2.01 g Sodium Silicate N to the deionized water. The mixtures were continuously mixed on a magnetic stirrer for 1 minute. 2#/T of the silicate complex was immediately added to a pretreated paper furnish for drainage rate measurement. The pretreated furnish was prepared by adding the following additives to the paper furnish in the following order: 10 #/T of cationic starch, 5 #/T of alum, and 0.5 #/T of CPAM (PC8138). Each additive except CPAM (PC8138) was mixed for 10 seconds. CPAM (PC8138) was mixed for 60 seconds.

For Test No. 8 shown in Table 3, the Ca silicate complex was prepared by first adding 2.5 g of 2% $CaCl_2$ solution to 245.49 g of deionized water, and subsequently adding 2.01 Sodium Silicate N to the deionized water. The mixtures were continuously mixed on a magnetic stirrer for 1 minute. 2#/T of the silicate complex was immediately added to a pretreated paper furnish for drainage rate measurement. The pretreated furnish was prepared by adding the following additives to the paper furnish in the following order: 10 #/T of cationic starch, 5 #/T of alum, and 0.5 #/T of CPAM (PC8138). Each additive except CPAM (PC8138) was mixed for 10 seconds. CPAM (PC8138) was mixed for 60 seconds.

For Test No. 9 shown in Table 3, the Ca silicate complex was prepared by first adding 3.75 g of 2% $CaCl_2$ solution to 244.24 g of deionized water, and subsequently adding 2.01 Sodium Silicate N to the deionized water. The mixtures were continuously mixed on a magnetic stirrer for 1 minute. 2#/T of the silicate complex was immediately added to a pretreated paper furnish for drainage rate measurement. The pretreated furnish was prepared by adding the following additives to the paper furnish in the following order: 10 #/T of cationic starch, 5 #/T of alum, and 0.5 #/T of CPAM (PC8138). Each additive except CPAM (PC8138) was mixed for 10 seconds. CPAM (PC8138) was mixed for 60 seconds.

For Test No. 10 shown in Table 3, the Ca silicate complex was prepared by first adding 5 g of 2% $CaCl_2$ solution to 242.99 g of deionized water, and subsequently adding 2.01 g Sodium Silicate N to the deionized water. The mixtures were continuously mixed on a magnetic stirrer for 1 minute. 2#/T of the silicate complex was immediately added to a pretreated paper furnish for drainage rate measurement. The pretreated furnish was prepared by adding the following additives to the paper furnish in the following order: 10 #/T of cationic starch, 5 #/T of alum, and 0.5 #/T of CPAM (PC8138). Each additive except CPAM (PC8138) was mixed for 10 seconds. CPAM (PC8138) was mixed for 60 seconds.

For Test No. 11 shown in Table 3, the Mg silicate complex was prepared by first adding 2.5 g of 1% $MgCl_2$ solution to 245.49 g of deionized water, and subsequently adding 2.01 g Sodium Silicate N to the deionized water. The mixtures were continuously mixed on a magnetic stirrer for 1 minute. 2#/T of the silicate complex was immediately added to a pretreated paper furnish for drainage rate measurement. The pretreated furnish was prepared by adding the following additives to the paper furnish in the following order: 10 #/T cationic starch, 5 #/T of alum, and 0.5 #/T of CPAM (PC8138). Each additive except CPAM (PC8138) was mixed for 10 seconds. CPAM (PC8138) was mixed for 60 seconds.

For Test No. 12 shown in Table 3, the Mg silicate complex was prepared by first adding 5 g of 1 % $MgCl_2$ solution to 242.99 g of deionized water, and subsequently adding 2.01 g Sodium Silicate N to the deionized water. The mixtures were continuously mixed on a magnetic stirrer for 1 minute. 2#/T of the silicate complex was immediately added to a pretreated paper furnish for drainage rate measurement. The pretreated furnish was prepared by adding the following additives to the paper furnish in the following order: 10 #/T of cationic starch, 5 #/T of alum, and 0.5 #/T of CPAM (PC8138). Each additive except CPAM (PC8138) was mixed for 10 seconds. CPAM (PC8138) was mixed for 60 seconds.

For Test No. 13 shown in Table 3, the Mg silicate complex was prepared by first adding 7.5 g of 1% $MgCl_2$ solution to 240.49 g of deionized water, and subsequently adding 2.01 g Sodium Silicate N to the deionized water. The mixtures were continuously mixed on a magnetic stirrer for 1 minute. 2#/T of the silicate complex was immediately added to a pretreated paper furnish for drainage rate measurement. The pretreated furnish was prepared by adding the following additives to the paper furnish in the following order: 10 #/T of cationic starch, 5 #/T of alum, and 0.5 #/T of CPAM (PC8138). Each additive except CPAM (PC8138) was mixed for 10 seconds. CPAM (PC8138) was mixed for 60 seconds.

For Test No. 14 shown in Table 3, the Mg silicate complex was prepared by first adding 10 g of 1% $MgCl_2$ solution to 237.99 g of deionized water, and subsequently adding 2.01 Sodium Silicate N to the deionized water. The mixtures were continuously mixed on a magnetic stirrer for 1 minute. 2#/T of the silicate complex was immediately added to a pretreated paper furnish for drainage rate measurement. The pretreated furnish was prepared by adding the following additives to the paper furnish in the following order: 10 #/T of cationic starch, 5 #/T of alum, and 0.5 #/T of CPAM (PC8138). Each additive except CPAM (PC8138) was mixed for 10 seconds. CPAM (PC8138) was mixed for 60 seconds.

The resulting paper furnishes of Test Nos. 1–14 were then transferred to a CSF device so that drainage rates were measured. The results of the samples in this example are shown in Table 3 below.

TABLE 3

| Test No. | Sample I.D. | M'/Si Molar ratio | Silicate addition (#/T as Solid) | CSF (ml) |
|---|---|---|---|---|
| 1 | Control - no additive | | 0 | 430 |
| 2 | Control - Bentonite | | 2 | 670 |
| 3 | Na Silicate N | 0 | 2 | 518 |
| 4 | Ca Silicate | 0.006 | 2 | 540 |
| 5 | Ca Silicate | 0.012 | 2 | 560 |
| 6 | Ca Silicate | 0.024 | 2 | 590 |
| 7 | Ca Silicate | 0.035 | 2 | 618 |
| 8 | Ca Silicate | 0.047 | 2 | 643 |
| 9 | Ca Silicate | 0.071 | 2 | 668 |
| 10 | Ca Silicate | 0.094 | 2 | 653 |
| 11 | Mg Silicate | 0.028 | 2 | 570 |
| 12 | Mg Silicate | 0.055 | 2 | 615 |
| 13 | Mg Silicate | 0.083 | 2 | 645 |
| 14 | Mg Silicate | 0.110 | 2 | 658 |

Table 3 clearly illustrates that Ca and Mg silicate complexes having a molar ratio from 0.006 to 0.11 (samples of Test Nos. 3 to 14) significantly improve drainage properties of the paper furnish. Similarly, the addition of sodium silicate or bentonite to the paper furnish also increases drainage rate.

All the solutions containing the silicated complexes of the present invention were clear solutions.

Example 3

A control sample (Test No. 1 shown in Table 4 below) was prepared by adding to a paper furnish pretreated with 10 #/T of cationic starch, 5 #/T of alum, 1 #/T of CPAM (PC8695).

A Na Silicate O sample (Test No. 2 shown in Table 4 below) was also included in this example. Na Silicate O was diluted to 0.075 wt % $SiO_2$ by adding 0.254 g of Na Silicate o to 99.75 g of deionized water prior to being added to a paper furnish that has been pretreated with 10 #/T of cationic starch, 5 #/T of alum, 1 #/T of CPAM (PC8695).

Four Ca/Mg silicate complexes (Test Nos. 3–6 shown in Table 4 below) containing 0.075 wt % $SiO_2$ and having a various amount of M'/Si molar ratio as shown in Table 4 were prepared as follows:

For Test No. 3, the complex was prepared by adding 0.254 g of Na Silicate O to 99.75 g of water containing Mg/Ca ions and having a hardness of 34 ppm Ca equivalent. 2 #/T of the complex was then added to a paper furnish that has been pretreated with 10 #/T of cationic starch, 5 #/T of alum, 1 #/T of CPAM (PC8695). The mixture was continuously mixed for about 30 minutes and then allowed to stand for 3 hours. The paper furnishes were then transferred to a CSF device so that drainage rates were measured.

For Test No. 4, the complex was prepared by adding 0.254 g of Na Silicate O to 99.75 g of water containing Mg/Ca ions and having a hardness of 68 ppm Ca equivalent. 2 #/T of the complex was then added to a paper furnish that has been pretreated with 10 #/T of cationic starch, 5 #/T of alum, 1 #/T of CPAM. The mixture was continuously mixed for about 30 minutes and then allowed to stand for 3 hours. The paper furnishes were then transferred to a CSF device so that drainage rates were measured.

For Test No. 5, the complex was prepared by adding 0.254 g of Na Silicate O to 99.75 g of water containing Mg/Ca ions and having a hardness of 102 ppm Ca equivalent. 2 #/T of the complex was then added to a paper furnish that has been pretreated with 10 #/T of cationic starch, 5 #/T of alum, 1 #/T of CPAM. The mixture was continuously mixed for about 30 minutes and then allowed to stand for 3 hours. The paper furnishes were then transferred to a CSF device so that drainage rates were measured.

For Test No. 6, the complex was prepared by adding 0.254 g of Na Silicate O to 99.75 g of water containing Mg/Ca ions and having a hardness of 136 ppm Ca equivalent. 2 #/T of the complex was then added to a paper furnish that has been pretreated with 10 #/T of cationic starch, 5 #/T of alum, 1 #/T of CPAM. The mixture was continuously mixed for about 30 minutes and then allowed to stand for 3 hours. The paper furnishes were then transferred to a CSF device so that drainage rates were measured.

The results of the samples in this example are summarized in Table 4 below.

TABLE 4

| Test No. | Sample I.D. | M'/Si Molar ratio | Silicate addition (#/T as $SiO_2$) | CSF (ml) |
|---|---|---|---|---|
| 1 | Control | | 0 | 435 |
| 2 | Na Silicate O | 0 | 2 | 510 |
| 3 | Ca/Mg Silicate | 0.068 | 2 | 593 |
| 4 | Ca/Mg Silicate | 0.136 | 2 | 613 |
| 5 | Ca Mg Silicate | 0.204 | 2 | 635 |
| 6 | Ca Mg Silicate | 0.272 | 2 | 473 |

Table 4 illustrates that the use of Ca/Mg silicate complexes having (Ca+Mg)/Si ratios of 0.068 to 0.204 significantly improves drainage properties of the paper furnish. In contrast, the use of a Ca/Mg silicate complex (as shown in samples of Test NO. 6) having a (Ca+Mg)/Si ratio of 0.272 forms a precipitate, and thus does not show much improvement in drainage properties of the paper furnish.

Table 4 also shows that the presence of sodium silicate to the paper furnish increases drainage activities.

All the solutions containing the silicated complexes of the present invention were clear solutions with the exception of the solution of Test No. 6 which contains precipitate visible to the naked eye. Thus, all of the silicate complexes resulting from Example 3 were water soluble with the exception of Test No. 6 (having a hardness of 136 ppm Ca equivalent) which yields precipitate.

Example 4

The samples of Test Nos. 3–6 (as shown in Table 5 below) of this example were the same as those of Test Nos. 3–6 of Example 3 with the exception that the paper furnish was treated with APAM (PA8130) instead of CPAM. That is, prior to the addition of the Ca/Mg silicate complexes, 10 #/T of cationic starch, 5 #/T of alum, and 0.5 #/T of APAM were sequentially added to the paper furnish.

A Na silicate O sample (Test No. 2 shown in Table 5 below) containing no Ca or Mg ions was also prepared. Na silicate O was diluted to 0.075 wt % $SiO_2$ in deionized water and then added to a paper furnish containing 10 #/T of cationic starch, 5 #/T of alum, and 0.5 #/T of APAM (PA8130).

A control sample (Test No. 1 shown in Table 5 below) containing only a paper furnish was prepared. The paper furnish has been pretreated with 10 #/T of cationic starch, 5 #/T of alum, and 0.5 #/T of APAM (PA8130).

The resulting paper furnishes were transferred to a CSF device so that drainage rates were measured. The results are summarized in Table 5 below.

TABLE 5

| Test No. | Sample I.D. | M'/Si Molar ratio | Silicate addition (#/T as $SiO_2$) | CSF (ml) |
| --- | --- | --- | --- | --- |
| 1 | Control | | 0 | 519 |
| 2 | Na Silicate O | 0 | 2 | 569 |
| 3 | Ca/Mg Silicate | 0.068 | 2 | 574 |
| 5 | Ca/Mg Silicate | 0.204 | 2 | 604 |
| 6 | Ca/Mg Silicate | 0.272 | 2 | 559 |

As shown in Table 5, when the paper furnish was treated with an anionic polymer together with Ca/Mg silicate, improvement in drainage was achieved. Similarly, the addition of sodium silicate to the paper furnish increases drainage rate.

Example 5

A control sample (Test No. 1 shown in Table 5 below) was prepared by adding to a paper furnish 10 #/T of cationic starch, 5 #/T of alum, and 1 #/T of CPAM (NOVUS 8910).

Nine samples of Ca/Mg silicate complexes (Test Nos. 2–10 shown in Table 6) containing 0.3 wt % $SiO_2$ and having a (Ca+Mg)/Si molar ratio of 0.034 were prepared as follows:

For Test No. 2, the complex was prepared by mixing 1 g of Na Silicate STIXSO RR to 99.00 g of water containing Mg/Ca ions and having a hardness of 68 ppm Ca equivalent. The mixture was continuously mixed for 30 minutes and then allowed to stand for 3 hours. 2 #/T of the complex was then added to a paper furnish that has been pretreated with 10 #/T of cationic starch, 5 #/T of alum, and 1 #/T of CPAM (NOVUS 8910).

For Test No. 3, the complex was prepared by mixing 1.083 g of Na Silicate E to 98.92 g of water containing Mg/Ca ions and having a hardness of 68 ppm Ca equivalent. The mixture was continuously mixed for 30 minutes and then allowed to stand for 3 hours. 2 #/T of the complex was then added to a paper furnish that has been pretreated with 10 #/T of cationic starch, 5 #/T of alum, and 1 #/T of CPAM (NOVUS 8910).

For Test No. 4, the complex was prepared by mixing 1.045 g of Na Silicate N to 98.95 g of water containing Mg/Ca ions and having a hardness of 68 ppm Ca equivalent. The mixture was continuously mixed for about 30 minutes and then allowed to stand for 3 hours. 2 #/T of the complex was then added to a paper furnish that has been pretreated with 10 #/T of cationic starch, 5 #/T of alum, and 1 #/T of CPAM (NOVUS 8910).

For Test No. 5, the complex was prepared by mixing 1.017 g of Na Silicate O to 98.98 g of water containing Mg/Ca ions and having a hardness of 68 ppm Ca equivalent. The mixture was continuously mixed for about 30 minutes and then allowed to stand for 3 hours. 2 #/T of the complex was then added to a paper furnish that has been pretreated with 10 #/T of cationic starch, 5 #/T of alum, and 1 #/T of CPAM (NOVUS 8910).

For Test No. 6, the complex was prepared by mixing 1.027 g of Na Silicate, grade 40 to 98.97 g of water containing Mg/Ca ions and having a hardness of 68 ppm Ca equivalent. The mixture was continuously mixed for about 30 minutes and then allowed to stand for 3 hours. 2 #/T of the complex was then added to a paper furnish that has been pretreated with 10 #/T of cationic starch, 5 #/T of alum, and 1 #/T of CPAM (NOVUS 8910).

For Test No. 7, the complex was prepared by mixing 1 g of Na Silicate, grade 42 to 99.00 g of water containing Mg/Ca ions and having a hardness of 68 ppm Ca equivalent. The mixture was continuously mixed for about 30 minutes and then allowed to stand for 3 hours. 2 #/T of the complex was then added to a paper furnish that has been pretreated with 10 #/T of cationic starch, 5 #/T of alum, and 1 #/T of CPAM (NOVUS 8910).

For Test No. 8, the complex was prepared by mixing 0.946 g of Na Silicate K to 99.05 g of water containing Mg/Ca ions and having a hardness of 68 ppm Ca equivalent. The mixture was continuously mixed for about 30 minutes and then allowed to stand for 3 hours. 2 #/T of the complex was then added to a paper furnish that has been pretreated with 10 #/T of cationic starch, 5 #/T of alum, and 1 #/T of CPAM (NOVUS 8910).

For Test No. 9, the complex was prepared by mixing 0.935 g of Na Silicate M to 99.07 g of water containing Mg/Ca ions and having a hardness of 68 ppm Ca equivalent. The mixture was continuously mixed for about 30 minutes and then allowed to stand for 3 hours. 2 #/T of the complex was then added to a paper furnish that has been pretreated with 10 #/T of cationic starch, 5 #/T of alum, and 1 #/T of CPAM (NOVUS 8910).

For Test No. 10, the complex was prepared by mixing 1.020 g of Na Silicate D to 98.98 g of water containing Mg/Ca ions and having a hardness of 68 ppm Ca equivalent. The mixture was continuously mixed for about 30 minutes and then allowed to stand for 3 hours. 2 #/T of the complex was then added to a paper furnish that has been pretreated with 10 #/T of cationic starch, 5 #/T of alum, and 1 #/T of CPAM (NOVUS 8910).

The paper furnishes were then transferred to a CSF device so that drainage rates were measured. The results are illustrated in Table 6.

TABLE 6

| Test No. | Source of Sodium Silicate | $SiO_2/Na_2O$ of Silicates | CSF (ml) |
| --- | --- | --- | --- |
| 1 | Control | | 470 |
| 2 | Sodium Silicate STIXSO RR | 3.25 | 663 |
| 3 | Sodium Silicate, E | 3.22 | 673 |
| 4 | Sodium Silicate, N | 3.22 | 668 |
| 5 | Sodium Silicate, O | 3.22 | 663 |
| 6 | Sodium Silicate, grade 40 | 3.22 | 655 |
| 7 | Sodium Silicate, grade 42 | 3.22 | 655 |
| 8 | Sodium Silicate, K | 2.88 | 640 |
| 9 | Sodium Silicate, M | 2.58 | 608 |
| 10 | Sodium Silicate, D | 2.0 | 580 |

As demonstrated in Table 6, sodium silicates having a $SiO_2/Na_2O$ weight ratio in the range from 2.0 to 3.25 form active Ca/Mg silicate complexes.

Example 6

The Ca/Mg silicate complexes used in this example were the same as the ones in Example 5, with the exception of the use of 0.25 #/T of APAM (PA8130) instead of 1#/T of CPAM. That is, 10 #/T of cationic starch, 5 #/T of alum, 0.25 #/T of APAM, and 2 #/T of Ca/Mg silicate complexes (as $SiO_2$) were sequentially added to the paper furnish.

The control sample of this example was the same as the one in Example 5, with the exception of the use of 0.25 #/T of APAM (PA8130) instead of 1#/T of CPAM.

The treated paper furnishes were then transferred to a CSF device so that drainage rates were measured. The results are summarized in Table 7 below.

TABLE 7

| Source of Sodium Silicate | $SiO_2/Na_2O$ of silicates | CSF (ml) |
| --- | --- | --- |
| Control | | 468 |
| Sodium Silicate STIXSO RR | 3.25 | 540 |
| Sodium Silicate, E | 3.22 | 535 |
| Sodium Silicate, N | 3.22 | 538 |
| Sodium Silicate, O | 3.22 | 545 |
| Sodium Silicate, grade 40 | 3.22 | 533 |
| Sodium Silicate, grade 42 | 3.22 | 540 |
| Sodium Silicate, K | 2.88 | 520 |
| Sodium Silicate, M | 2.58 | 483 |
| Sodium Silicate, D | 2.0 | 480 |

As illustrated in Table 7, the Ca/Mg silicate complexes formed from sodium silicates having $SiO_2/Na_2O$ weight ratios in the range from 2.0 to 3.25 improve the drainage rates of the paper furnish treated with APAM flocculent.

Example 7

A control sample (Test No. 1 shown in Table 8 below) was prepared placing a paper furnish in a CSF device so that drainage rates were measured.

Another control sample (Test No.2 shown in Table 8 below) was prepared by adding to a paper furnish 0.5 #/T of CPAM (PC8138).

A 0.15% $CaCl_2$ sample (Test No.3 shown in Table 8 below) was prepared by adding 0.452 g of concentrated $CaCl_2$ solution (having a 38% dry solid manufactured by TETRA Technology) to 114.5 g of deionized water. The 0.15% $CaCl_2$ solution in the amount of 2#/T was added to a pretreated paper furnish for drainage rate measurement. The pretreated furnish was prepared by adding 0.5 #/T of CPAM (PC8138) to the paper furnish.

A Na Silicate N sample (Test No.4 shown in Table 8 below) containing no Ca or Mg ions was also prepared as follows: 0.803 g of Na Silicate N was diluted with 99.20 g of deionized water to a concentration of 0.3 wt % and continuously mixed for 1 minute. 2 #/T of the diluted Na silicate was then immediately added to a paper furnish that has been pretreated with 0.5 #/T of CPAM (PC8138).

For Test Nos. 5–8 shown in Table 8 below, the Ca silicate complexes were prepared together. The Ca silicate complex in these tests was prepared by adding 20 g of 0.15% $CaCl_2$ solution and 0.803 g Sodium Silicate N to 89.2 g of deionized water. The solution was continuously mixed on a magnetic stirrer for 1 minute. For Test Nos. 5–8, 2#/T of the silicate complex was immediately added to a pretreated paper furnish for drainage rate measurement.

For Test No. 5, the pretreated furnish was prepared by adding 0.5 #/T of CPAM (PC8138) to the paper furnish.

For Test No. 6, the pretreated furnish was prepared by adding 5#/T of alum and then 0.5 #/T of CPAM (PC8138) to the paper furnish.

For Test No.7, the pretreated fuimish was prepared by adding 10#/T of cationic starch and then 0.5 #/T of CPAM (PC8138) to the paper furnish.

For Test No. 8, The pretreated furnish was prepared by adding to the furnish the following additives: 10#/T of cationic starch, 5 #/T of alum, and 0.5 #/T of CPAM (PC8138).

The final paper furnishes were then transferred to a CSF device so that drainage rates were measured. The results of this example are shown in Table 8 below.

TABLE 8

| Test No. | Additives #1 | Additives #2 | Additives #3 | Additives #4 | CSF (ml) |
| --- | --- | --- | --- | --- | --- |
| 1 | None | None | None | None | 400 |
| 2 | None | None | 0.5 #/T PAM | None | 420 |
| 3 | None | None | 0.5 #/T PAM | 2 #/T $CaCl_2$ | 413 |
| 4 | None | None | 0.5 #/T PAM | 2 #/T Na Silicate N | 420 |
| 5 | None | None | 0.5 #/T PAM | 2 # T Ca Silicate | 558 |
| 6 | None | 5 #/T Alum | 0.5 #/T PAM | 2 # T Ca Silicate | 555 |
| 7 | 10 #/T C-starch | None | 0.5 #/T PAM | 2 # T Ca Silicate | 590 |
| 8 | 10 #/T C-starch | 5 #/T Alum | 0.5 #/T PAM | 2 # T Ca Silicate | 650 |

As can be seen in Table 8, Test Nos. 3 and 4 (containing $CaCl_2$ and Sodium Silicate N, respectively) have no drainage activity, whereas the calcium silicate complex has a significant drainage activity. The results in the Table 8 also demonstrate that the Ca silicate complex has an optimum performance when a cationic starch, alum, and a cationic flocculant (CPAM (PC8138)) were added to the paper furnish. Also, Ca silicate complex with the addition of at least one additive also enhance drainage activity in paper furnish.

Example 8

In this example, a Ca/Mg silicate complex having a concentration of 0.3% $SiO_2$ and a (Ca+Mg) Si molar ratio of 0.0 34 was prepared by reacting 1.02 g of Sodium Silicate O with 98.98 g of Ca/Mg solution having a hardness of 68 ppm equivalent Ca.

In the drainage study, the Ca/Mg silicate complex was compared to a series of samples in which sodium silicates and Ca or Mg ions of $CaCl_2$ and $MgCl_2$ were added to the paper furnish separately without being premixed to form Ca or Mg silicate complexes. The amount of the silicate complexes and sodium silicate are shown in Table 9 below. The furnish treatments consisted of a sequential addition of 10 #/T of cationic starch, 5 #/T of alum, and 1 #/T of CPAM (PC8695), followed by the testing additives as shown in Table 9 below.

The dosage of the Ca/Mg silicate complex was determined as $SiO_2$ and Sodium Silicate O, $CaCl_2$ and $MgCl_2$ were determined as dry solid of the products.

The treated paper furnishes were transferred to a CSF device so that drainage rates were measured. The results of this example are shown in Table 9.

TABLE 9

| Test No. | Additives as Advanced Drainage Aid | CSF (ml) |
| --- | --- | --- |
| 1 | Control 1 - no additive as ADA | 440 |
| 2 | Control 2 - 2 #/T Sodium Silicate O | 535 |
| 3 | 2 #/T Sodium Silicate O + 2 #/T $CaCl_2$ | 540 |
| 4 | 2 #/T Sodium Silicate O + 4 #/T $CaCl_2$ | 545 |
| 5 | 2 #/T Sodium Silicate 10 + 10 #/T $CaCl_2$ | 540 |
| 6 | 2 #/T Sodium Silicate 0 + 2 #/T $MgCl_2$ | 545 |
| 7 | 2 #/T Sodium Silicate 0 + 8 #/T $MgCl_2$ | 540 |
| 8 | 2 #/T Ca/Mg Silicate Complex | 635 |

As illustrated in this Table 9, pre-formed Ca/Mg silicate complex of Test No. 8 outperforms the simple combination of the sodium silicate and Ca or Mg ions (without pre-forming Ca or Mg silicate complexes) of Test Nos. 3–7 on drainage improvement. Table 9 also illustrates that the simple combination of the sodium silicate and Ca or Mg ions yield essentially the same drainage improvement as the sodium silicate itself in Test No. 2.

Example 9

A control sample (Test No. 1 shown in Table 10 below) was prepared by sequentially adding 10 #/T of cationic starch, 5 #/T of alum, and 0.5 #/T of CPAM (PC8138) to a paper furnish. The paper furnish was then transferred to a CSF device so that drainage rates were measured. The result of this control sample is shown in Table 10 below.

Seven Ca silicate complexes (Test Nos. 2–8 shown in Table 10 below) having an $SiO_2$ concentration of 0.3% dry weight and a Ca/Si ratio of 0.071 were used in this example. Each of these seven Ca silicate complexes were prepared at 22° C. by adding 3.75 g of 2% $CaCl_2$ with 244.24 g of deionized water and subsequently adding 2.01 g of Sodium Silicate N to the deionized water.

In Test No. 2, when the reaction has been proceeded for about 0.5 minute, 2#/T of the Ca complex was then transferred to a paper furnish that has been pretreated with 10 #/T of cationic starch, 5 #/T of alum, and 0.5 #/T of CPAM (PC8138). The paper furnish was then immediately transferred to a CSF device so that drainage rate was measured.

In Test No. 3, when the reaction has been proceeded for about 4.3 minutes, 2#/T of the Ca complex was then transferred to a paper furnish that has been pretreated with 10 #/T of cationic starch, 5 #/T of alum, and 0.5 #/T of CPAM (PC8138). The paper furnish was then immediately transferred to a CSF device so that drainage rate was measured.

In Test No. 4, when the reaction has been proceeded for about 7.3 minutes, 2#/T of the Ca complex was then transferred to a paper furnish that has been pretreated with 10 #/T of cationic starch, 5 #/T of alum, and 0.5 #/T of CPAM (PC8138). The paper furnish was then immediately transferred to a CSF device so that drainage rate was measured.

In Test No. 5, when the reaction has been proceeded for about 15.5 minutes, 2#/T of the Ca complex was transferred to a paper furnish that has been pretreated with 10 #/T of cationic starch, 5 #/T of alum, and 0.5 #/T of CPAM (PC8138). The paper furnish was then immediately transferred to a CSF device so that drainage rate was measured.

In Test No. 6, when the reaction has been proceeded for about 30 minutes, 2#/T of the Ca complex was transferred to a paper furnish that has been pretreated with 10 #/T of cationic starch, 5 #/T of alum, and 0.5 #/T of CPAM (PC8138). The paper furnish was then immediately transferred to a CSF device so that drainage rate was measured.

In Test No. 7, when the reaction has been proceeded for about 39 minutes, 2#/T of the Ca complex was transferred to a paper furnish that has been pretreated with 10 #/T of cationic starch, 5 #/T of alum, and 0.5 #/T of CPAM (PC8138). The paper furnish was then immediately transferred to a CSF device so that drainage rate was measured.

In Test No. 8, when the reaction has been proceeded for about 59 minutes, 2#/T of the Ca complex was transferred to a paper furnish that has been pretreated with 10 #/T of cationic starch, 5 #/T of alum, and 0.5 #/T of CPAM (PC8138). The paper furnish was then immediately transferred to a CSF device so that drainage rate was measured.

Two Ca silicate complexes (Test Nos. 9 and 10 shown in Table 10 below) having an $SiO_2$ concentration of 0.3% dry weight and a Ca/Si ratio of 0.071 were used in this example. Each of these two Ca silicate complexes were prepared at 50° C. by adding 3.75 g of 2% $CaCl_2$ with 244.24 g of deionized water and subsequently adding 2.01 g of Sodium Silicate N to the deionized water.

In Test No. 9, when the reaction has been proceeded for about 0.5 minute, 2#/T of the Ca complex was then transferred to a paper furnish that has been pretreated with 10 #/T of cationic starch, 5 #/T of alum, and 0.5 #/T of CPAM (PC8138) to the paper furnish. The paper furnish was then transferred to a CSF device so that drainage rate was measured.

In Test No. 10, when the reaction has been proceeded for about 3 minutes, 2#/T of the Ca complex was then transferred to a paper furnish that has been pretreated with 10 #/T of cationic starch, 5 #/T of alum, and 0.5 #/T of CPAM (PC8138) to the paper furnish. The paper furnish was then transferred to a CSF device so that drainage rate was measured.

Five Ca silicate complexes (Test Nos. 11 to 15 shown in Table 10 below) having an $SiO_2$ concentration of 0.3% dry weight and a Ca/Si ratio of 0.012 were used in this example. Each of these five Ca silicate complexes were prepared at 50° C. by adding 0.625 g of 2% $CaCl_2$ with 247.37 g of deionized water and subsequently adding 2.01 g of Sodium Silicate N to the deionized water.

In Test No. 11, when the reaction has been proceeded for about 0.5 minute, 2#/T of the Ca complex was then transferred to a paper furnish that has been pretreated with 10 #/T of cationic starch, 5 #/T of alum, and 0.5 #/T of CPAM (PC8138) to the paper furnish. The paper furnish was then transferred to a CSF device so that drainage rate was measured.

In Test No. 12, when the reaction has been proceeded for about 3.3 minutes, 2#/T of the Ca complex was then transferred to a paper furnish that has been pretreated with 10 #/T of cationic starch, 5 #/T of alum, and 0.5 #/T of CPAM (PC8138) to the paper furnish. The paper furnish was then transferred to a CSF device so that drainage rate was measured.

In Test No. 13 when the reaction has been proceeded for about 6.3 minutes, 2#/T of the Ca complex was then transferred to a paper furnish that has been pretreated with 10 #/T of cationic starch, 5 #/T of alum, and 0.5 #/T of CPAM (PC8138) to the paper furnish. The paper furnish was then transferred to a CSF device so that drainage rate was measured.

In Test No. 14 when the reaction has been proceeded for about 17 minutes, 2#/T of the Ca complex was then transferred to a paper furnish that has been pretreated with 10 #/T of cationic starch, 5 #/T of alum, and 0.5 #/T of CPAM (PC8138) to the paper furnish. The paper furnish was then transferred to a CSF device so that drainage rate was measured.

In Test No. 15 when the reaction has been proceeded for about 20.5 minutes, 2#/T of the Ca complex was then transferred to a paper furnish that has been pretreated with 10 #/T of cationic starch, 5 #/T of alum, and 0.5 #/T of CPAM (PC8138) to the paper furnish. The paper furnish was then transferred to a CSF device so that drainage rate was measured.

The results of the above test samples are below.

TABLE 10

| Sample I.D. | Ca Silicate Reaction Time (min.) | Ca Silicate Dosage (#/T) | CSF (ml) |
|---|---|---|---|
| 1 |  | 0 | 430 |
| 2 | 0.5 | 2 | 665 |
| 3 | 4.3 | 2 | 675 |
| 4 | 7.3 | 2 | 675 |
| 5 | 15.5 | 2 | 680 |
| 6 | 30 | 2 | 685 |
| 7 | 39 | 2 | 675 |
| 8 | 59 | 2 | 680 |
| 9 | 0.5 | 2 | 635 |
| 10 | 3.0 | 2 | 635 |
| 11 | 0.5 | 2 | 550 |
| 12 | 3.3 | 2 | 635 |
| 13 | 6.3 | 2 | 665 |
| 14 | 17 | 2 | 680 |
| 15 | 20.5 | 2 | 675 |

As illustrated by the results summarized in Table 10, when the molar ratio of Ca/Si is 0.071, the Ca silicate complex quickly reaches its maximum drainage activity shortly after the reaction started. However, at a lower Ca/Si molar ratio, the reaction period was prolonged even when the reaction temperature was increased to (50° C.).

Example 10

The Ca/Mg silicate complexes used in Test Nos. 2–4 and 6 were the same as they were prepared together. This Ca/Mg silicate complex has a concentration of 0.3 wt % and a (Ca+Mg)/Si molar ratio of 0.034 and was prepared by mixing 1.02 #/T of Sodium Silicate O with 98 g of Ca/Mg solution having a hardness of 68 ppm Ca equivalent for about 30 minutes and then was allowed to stand for about 3 hours.

Specifically, the six samples (Test Nos. 1–6 shown in Table 11) were prepared for this example as follows;

Test No. 1 was prepared by sequentially adding 10 #/T of cationic starch and 1 #/T of CPAM (PC8695) to a paper furnish. The paper furnish was then transferred to a CSF device so that drainage rates were measured. The result of this control sample is shown in Table 11 below.

In Test No. 2, 2 #/T of the Ca/Mg silicate complex was added to a paper furnish that has been pretreated by sequentially adding 10 #/T of cationic starch and 2 #/T of CPAM (PC8695) to the paper furnish. The paper furnish was then transferred to a CSF device so that drainage rate can be measured.

In Test No. 3, 4 #/T of the Ca/Mg silicate complex was added to a paper furnish that has been pretreated by sequentially adding 10 #/T of cationic starch and 1 #/T of CPAM (PC8695) to the paper furnish. The paper furnish was then transferred to a CSF device so that drainage rate can be measured.

In Test No. 4, 6 #/T of the Ca/Mg silicate complex was added to a paper furnish that has been pretreated by sequentially adding 10 #/T of cationic starch and 1 #/T of CPAM (PC8695) to the paper furnish. The paper furnish was then transferred to a CSF device so that drainage rate can be measured.

Test No. 5 was prepared by adding 1 #/T of CPAM (PC8695) to a paper furnish. The paper furnish was then transferred to a CSF device so that drainage rates were measured. The result of this control sample was shown in Table 11 below.

In Test No. 6, 2 #/T of the Ca/Mg silicate complex was added to a paper furnish that has been pretreated by adding 1 #/T of CPAM (PC8695) to the paper furnish. The paper furnish was then transferred to a CSF device so that drainage rate can be measured.

TABLE 11

| Test No. | Cationic Starch (#/T product) | Cationic PAM (#/T active) | Ca/Mg Silicate Complexes (#/T SiO$_2$) | CSF (ml) |
|---|---|---|---|---|
| 1 | 10 | 1 | None | 440 |
| 2 | 10 | 1 | 2 | 580 |
| 3 | 10 | 1 | 4 | 582 |
| 4 | 10 | 1 | 6 | 570 |
| 5 | 0 | 1 | None | 470 |
| 6 | 0 | 1 | 2 | 593 |

As illustrated by in Table 11, the use of Ca/Mg demonstrates a significant drainage improvement (a) when only CPAM flocculent; and (b) when CPAM flocculant and cationic starch were present in the paper furnish.

Example 11

In this example four Ca/Mg complexes (Test Nos. 1–4 shown in Table 12) were prepared as follows:

In Test No.1, a Ca/Mg silicate complex having a concentration of 0.3 wt % SiO$_2$ and a (Ca+Mg)/Si molar ratio of 0.034 was prepared at 7° C. by reacting 1.02 g of Sodium Silicate O with 98.98 g of Ca/Mg solution containing 68 ppm hardness (as Ca equivalent). When the reactions have been proceeded for about 3 minutes, 2#/T of the Ca/Mg complex was immediately added to a paper furnish that has been pretreated with 10 #/T of cationic starch, 5 #/T of alum, and 1 #/T of CPAM (PC8695). The paper furnish was then transferred to a CSF device so that drainage rate was measured.

In Test No.2, a Ca/Mg silicate complex having a concentration of 0.3 wt % SiO$_2$ and a (Ca+Mg)/Si molar ratio of 0.034 was prepared at 15° C. by reacting 1.02 g of Sodium Silicate O with 98.98 g of Ca/Mg solution containing 68 ppm hardness (as Ca equivalent). When the reactions have been proceeded for about 3 minutes, 2#/T of the Ca/Mg complex was immediately added to a paper furnish that has been pretreated with 10 #/T of cationic starch, 5 #/T of alum, and 1 #/T of CPAM (PC8695). The paper furnish was then transferred to a CSF device so that drainage rate was measured.

In Test No. 3, a Ca/Mg silicate complex having a concentration of 0.3 wt % SiO$_2$ and a (Ca+Mg)/Si molar ratio of 0.034 was prepared at 20° C. by reacting 1.02 g of Sodium Silicate O with 98.98 g of Ca/Mg solution containing 68 ppm hardness (as Ca equivalent). When the reactions have been proceeded for about 3 minutes, 2#/T of the Ca/Mg complex was immediately added to a paper furnish that has been pretreated with 10 #/T of cationic starch, 5 #/T of alum, and 1 #/T of CPAM (PC8695). The paper furnish was then transferred to a CSF device so that drainage rate was measured.

In Test No. 4, a Ca/Mg silicate complex having a concentration of 0.3 wt % SiO$_2$ and a (Ca+Mg)/Si molar ratio of 0.034 was prepared at 50° C. by reacting 1.02 g of Sodium Silicate O with 98.98 g of Ca/Mg solution containing 68 ppm hardness (as Ca equivalent). When the reactions have been proceeded for about 3 minutes, 2#/T of the Ca/Mg complex was immediately added to a paper furnish that has been pretreated with 10 #/T of cationic starch, 5 #/T of alum, and 1 #/T of CPAM (PC8695). The paper furnish was then transferred to a CSF device so that drainage rate was measured.

The results of this example are shown in Table 12 below.

TABLE 12

| Test No. | Reaction Temperature (° C.) | Dosage (#/T SiO$_2$) | CSF (ml) |
|---|---|---|---|
| 1 | 7 | 2 | 538 |
| 2 | 15 | 2 | 540 |
| 3 | 20 | 2 | 555 |
| 4 | 50 | 2 | 605 |

As shown in Table 12, drainage activity of the Ca/Mg silicate complexes increases when the reaction temperature was increased.

Example 12

The Ca/Mg silicate complex used in of this example was the same as the complex of Example 10. Specifically, Ca/Mg silicate complex having a concentration of 0.3% SiO$_2$ and a (Ca+Mg) Si molar ratio of 0.0 34 was prepared by mixing 1.02 #/T of Sodium Silicate O with 98.98 g of Ca/Mg solution having a hardness of 68 ppm equivalent Ca for about 30 minutes and then allowing the mixture to stand for about 3 hours.

Test Nos. 1 to 12 shown in Table 13 were prepared as follows:

In Test No. 1, 10 #/T of cationic starch, 5 #/T of alum, and 1 #/T of CPAM (Novus 8910) were added to the furnish having a pH of 7.7.

In Test No. 2, 2 #/T of Ca/Mg silicate complex was added to a furnish having a pH of 7.7 and pretreated with 10 #/T of cationic starch, 5 #/T of alum, and 1 #/T of CPAM (Novus 8910).

In Test No. 3, 10 #/T of cationic starch, 5 #/T of alum, and 0.25 #/T of APAM (PA8130) were added to the furnish having a pH of 7.7.

In Test No. 4, 2 #/T of Ca/Mg silicate complex was added to a furnish having a pH of 7.7 and pretreated with 10 #/T of cationic starch, 5 #/T of alum, and 0.25 #/T of CPAM (PA8130).

In Test No. 5, 10 #/T of cationic starch, 5 #/T of alum, and 1 #/T of CPAM (Novus 8910) were added to the furnish having a pH of 8.7.

In Test No. 6, 2 #/T of Ca/Mg silicate complex was added to a furnish having a pH of 8.7 and pretreated with 10 #/T of cationic starch, 5 #/T of alum, and 1 #/T of CPAM (Novus 8910).

In Test No. 7, 10 #/T of cationic starch, 5 #/T of alum, and 0.25 #/T of APAM (PA8130) were added to the furnish having a pH of 8.7.

In Test No. 8, 2 #/T of Ca/Mg silicate complex was added to a furnish having a pH of 8.7 and pretreated with 10 #/T of cationic starch, 5 #/T of alum, and 0.25 #/T of APAM (PA8130).

In Test No. 9, 10 #/T of cationic starch, 5 #/T of alum, and 1 #/T of CPAM (Novus 8910) were added to the furnish having a pH of 9.6.

In Test No. 10, 2 #/T of Ca/Mg silicate complex was added to a furnish having a pH of 9.6 and pretreated with 10 #/T of cationic starch, 5 #/T of alum, and 1 #/T of CPAM (Novus 8910).

In Test No. 11, 10 #/T of cationic starch, 5 #/T of alum, and 0.25 #/T of APAM (PA8130) were added to the furnish having a pH of 9.6.

In Test No. 12, 2 #/T of Ca/Mg silicate complex was added to a furnish having a pH of 9.6 and pretreated with 10 #/T of cationic starch, 5 #/T of alum, and 0.25 #/T of APAM (PA8130).

The paper finishes were then transferred to a CSF device so that drainage rates were measured. The results of the drainage rate were also shown in Table 13 below.

TABLE 13

| Test No. | pH | Flocculant treatment | Ca/Mg Silicate (#/T SiO$_2$) | CSF (ml) |
|---|---|---|---|---|
| 1 | 7.7 | 1 #/T CPAM | 0 | 470 |
| 2 | 7.7 | 1 #/T CPAM | 2 | 648 |
| 3 | 7.7 | 0.25 #/T APAM | 0 | 485 |
| 4 | 7.7 | 0.25 #/T APAM | 2 | 548 |
| 5 | 8.7 | 1 #/T CPAM | 0 | 468 |
| 6 | 8.7 | 1 #/T CPAM | 2 | 660 |
| 7 | 8.7 | 0.25 #/T APAM | 0 | 468 |
| 8 | 8.7 | 0.25 #/T APAM | 2 | 563 |
| 9 | 9.6 | 1 #/T CPAM | 0 | 460 |
| 10 | 9.6 | 1 #/T CPAM | 2 | 668 |
| 11 | 9.6 | 0.25 #/T APAM | 0 | 463 |
| 12 | 9.6 | 0.25 #/T APAM | 2 | 553 |

As it can be seen in Table 13, the addition of Ca/Mg silicate complex to the paper furnish having a pH of 7.7 to 9.6 significantly increases drainage rate.

Example 13

The Ca/Mg silicate complex used in of this example was the same as the complex of Example 10. Specifically, Ca/Mg silicate complex having a concentration of 0.3% SiO$_2$ and a (Ca+Mg) Si molar ratio of 0.0 34 was prepared by reacting 1.02 #/T of Sodium Silicate O with 98.98 g of Ca/Mg solution having a hardness of 68 ppm equivalent Ca.

Test Nos. 1 to 16 shown in Table 14 were prepared as follows:

In Test No. 1, 10 #/T of cationic starch, 5 #/T of alum, and 1 #/T of CPAM (Novus 8910) were added to 1000 ml of a paper furnish having a 0.3 wt % consistency and containing 100% weight fibers and 0 wt % precipitated calcium carbonate (PCC) filler by weight of the total dry finish.

In Test No. 2, 10 #/T of cationic starch, 5 #/T of alum, and 1 #/T of CPAM (Novus 8910) were added to 1000 ml of a paper furnish having a 0.3 wt % consistency and containing 100% weight fibers and 0 wt % precipitated calcium carbonate (PCC) filler by weight of the total dry finish. 2 #/T of Ca/Mg silicate complex was subsequently added to the paper furnish.

In Test No. 3, 10 #/T of cationic starch, 5 #/T of alum, and 0.25 #/T of APAM (PA8130) were added to 1000 ml of a paper furnish having a 0.3 wt % consistency and containing 100% weight fibers and 0 wt % precipitated calcium carbonate (PCC) filler by weight of the total dry finish.

In Test No. 4, 10 #/T of cationic starch, 5 #/T of alum, and 0.25 #/T of APAM (PA8130) were added to 1000 ml of a paper furnish having a 0.3 wt % consistency and containing 100% weight fibers and 0 wt % precipitated calcium carbonate (PCC) filler by weight of the total dry finish. 2 #/T of Ca/Mg silicate complex was subsequently added to the paper furnish.

In Test No. 5, 10 #/T of cationic starch, 5 #/T of alum, and 1 #/T of CPAM (Novus 8910) were added to 1000 ml of a paper furnish having a 0.3 wt % consistency and containing 90% weight fibers and 10 wt % precipitated calcium carbonate (PCC) filler by weight of the total dry finish.

In Test No. 6, 10 #/T of cationic starch, 5 #/T of alum, and 1 #/T of CPAM (Novus 8910) were added to 1000 ml of a paper furnish having a 0.3 wt % consistency and containing 90% weight fibers and 10 wt % precipitated calcium carbonate (PCC) filler by weight of the total dry finish. 2 #/T of Ca/Mg silicate complex was subsequently added to the paper furnish.

In Test No. 7, 10 #/T of cationic starch, 5 #/T of alum, and 0.25 #/T of APAM (PA8130) were added to 1000 ml of a paper furnish having a 0.3 wt % consistency and containing 90% weight fibers and 10 wt % precipitated calcium carbonate (PCC) filler by weight of the total dry finish.

In Test No. 8, 10 #/T of cationic starch, 5 #/T of alum, and 0.25 #/T of APAM (PA8130) were added to 1000 ml of a paper furnish having a 0.3 wt % consistency and containing 90% weight fibers and 10 wt % precipitated calcium carbonate (PCC) filler by weight of the total dry finish. 2 #/T of Ca/Mg silicate complex was subsequently added to to the paper furnish.

In Test No. 9, 10 #/T of cationic starch, 5 #/T of alum, and 1 #/T of CPAM (Novus 8910) were added to 1000 ml of a paper furnish having a 0.3 wt % consistency and containing 80% weight fibers and 20 wt % precipitated calcium carbonate (PCC) filler by weight of the total dry finish.

In Test No. 10, 10 #/T of cationic starch, 5 #/T of alum, and 1 #/T of CPAM (Novus 8910) were added to 1000 ml of a paper furnish having a 0.3 wt % consistency and containing 80% weight fibers and 20 wt % precipitated calcium carbonate (PCC) filler by weight of the total dry finish. 2 #/T of Ca/Mg silicate complex was subsequently added to the paper furnish.

In Test No. 11, 10 #/T of cationic starch, 5 #/T of alum, and 0.25 #/T of APAM (PA8130) were added to 1000 ml of a paper furnish having a 0.3 wt % consistency and containing 80% weight fibers and 20 wt % precipitated calcium carbonate (PCC) filler by weight of the total dry finish.

In Test No. 12, 10 #/T of cationic starch, 5 #/T of alum, and 0.25 #/T of APAM (PA8130) were added to 1000 ml of a paper furnish having a 0.3 wt % consistency and containing 80% weight fibers and 20 wt % precipitated calcium carbonate (PCC) filler by weight of the total dry finish. 2 #/T of Ca/Mg silicate complex was subsequently added to the paper furnish.

In Test No. 13, 10 #/T of cationic starch, 5 #/T of alum, and 1 #/T of CPAM (Novus 8910) were added to 1000 ml of a paper furnish having a 0.3 wt % consistency and containing 65% weight fibers and 35 wt % precipitated calcium carbonate (PCC) filler by weight of the total dry finish.

In Test No. 14, 10 #/T of cationic starch, 5 #/T of alum, and 1 #/T of CPAM (Novus 8910) were added to 1000 ml of apaper furnish having a 0.3 wt % consistency and containing 65% weight fibers and 35 wt % precipitated calcium carbonate (PCC) filler by weight of the total dry finish. 2 #/T of Ca/Mg silicate complex was subsequently added to the paper furnish.

In Test No. 15, 10 #/T of cationic starch, 5 #/T of alum, and 0.25 #/T of APAM (PA8130) were added to 1000 ml of a paper furnish having a 0.3 wt % consistency and containing 65% weight fibers and 35 wt % precipitated calcium carbonate (PCC) filler by weight of the total dry finish.

In Test No. 16, 10 #/T of cationic starch, 5 #/T of alum, and 0.25 #/T of APAM (PA8130) were added to 1000 ml of a paper furnish having a 0.3 wt % consistency and containing 65% weight fibers and 35 wt % precipitated calcium carbonate (PCC) filler by weight of the total dry finish. 2 #/T of Ca/Mg silicate complex was subsequently added to the paper furnish.

The paper furnishes were then transferred to a CSF device so that drainage rates were measured. The results are illustrated in Table 14.

TABLE 14

| Test No. | Filler level (% of dry solid) | Flocculant treatment | Ca/Mg Silicate (#/T SiO$_2$) | CSF (ml) |
|---|---|---|---|---|
| 1 | 0 | 1 #/T CPAM | 0 | 498 |
| 2 | 0 | 1 #/T CPAM | 2 | 648 |
| 3 | 0 | 0.25 #/T APAM | 0 | 463 |
| 4 | 0 | 0.25 #/T APAM | 2 | 510 |
| 5 | 10 | 1 #/T CPAM | 0 | 460 |
| 6 | 10 | 1 #/T CPAM | 2 | 653 |
| 7 | 10 | 0.25 #/T APAM | 0 | 463 |
| 8 | 10 | 0.25 #/T APAM | 2 | 540 |
| 9 | 20 | 1 #/T CPAM | 0 | 453 |
| 10 | 20 | 1 #/T CPAM | 2 | 653 |
| 11 | 20 | 0.25 #/T APAM | 0 | 463 |
| 12 | 20 | 0.25 #/T APAM | 2 | 540 |
| 13 | 35 | 1 #/T CPAM | 0 | 433 |
| 14 | 35 | 1 #/T CPAM | 2 | 665 |
| 15 | 35 | 0.25 #/T APAM | 0 | 455 |
| 16 | 35 | 0.25 #/T APAM | 2 | 538 |

As it can be seen from Table 14, Ca/Mg silicate complex yield significant drainage improvement on the paper furnish which has either a zero filler level or a filler level as high as 35 wt %.

Example 14

The Ca/Mg silicate complex used in this example was the same as the complex of Example 10. Specifically, Ca/Mg silicate complex having aconcentration of 0.3% SiO$_2$ and a (Ca+Mg) Si molar ratio of 0.0 34 was prepared by mixing 1.02 #/T of Sodium Silicate O with 98 g of Ca/Mg solution having a hardness of 68 ppm equivalent Ca for about 30 minutes and then allowing the mixture to stand for about 3 hours.

The samples of this example (Test Nos. 1 to 12 shown in Table 15 below) were directed to Britt Jar fines retention evaluation.

In Test No. 1, the retention evaluation was conducted by sequentially adding to a paper furnish, 10 #/T of cationic starch, 5 #/T of alum and 1#/T of CPAM (PC8695).

In Test No. 2, the retention evaluation was conducted by sequentially adding to a paper furnish, 10 #/T of cationic starch, 5 #/T of alum, 1#/T of CPAM (PC8695), and 2 #/T of Ca/Mg silicate complex.

In Test No. 3, the retention evaluation was conducted by sequentially adding to a paper furnish, 10 #/T of cationic starch, 5 #/T of alum, 1#/T of CPAM (PC8695), and 4 #/T of Ca/Mg silicate complex.

In Test No. 4, the retention evaluation was conducted by sequentially adding to a paper furnish, 10 #/T of cationic starch, 5 #/T of alum, 1#/T of CPAM (PC8695), and 6 #/T of Ca/Mg silicate complex.

In Test No. 5, the retention evaluation was conducted by sequentially adding, to a paper furnish, 10 #/T of cationic starch and 5 #/T of alum.

In Test No. 6, the retention evaluation was conducted by sequentially adding to a paper furnish, 10 #/T of cationic starch, 5 #/T of alum, and 2 #/T of Ca/Mg silicate complex.

In Test No. 7, the retention evaluation was conducted by sequentially adding to a paper furnish, 10 #/T of cationic starch, 5 #/T of alum, and 4 #/T of Ca/Mg silicate complex.

In Test No. 8, the retention evaluation was conducted by sequentially adding to a paper furnish, 10 #/T of cationic starch, 5 #/T of alum, and 6 #/T of Ca/Mg silicate complex.

In Test No. 9, the retention evaluation was conducted by sequentially adding to a paper furnish, 10 #/T of cationic starch, 5 #/T of alum and 0.25#/T of APAM (PA8130).

In Test No. 10, the retention evaluation was conducted by sequentially adding to a paper furnish, 10 #/T of cationic starch, 5 #/T of alum, 0.25#/T of APAM (PA8130), and 2 #/T of Ca/Mg silicate complex.

In Test No. 11, the retention evaluation was conducted by sequentially adding to a paper furnish, 10 #/T of cationic starch, 5 #/T of alum, 0.25#/T of APAM (PA8130), and 4 #/T of Ca/Mg silicate complex.

In Test No. 12, the retention evaluation was conducted by sequentially adding to a paper furnish, 10 #/T of cationic starch, 5 #/T of alum, 0.25#/T of APAM (PA8130), and 6 #/T of Ca/Mg silicate complex.

The paper finishes were then transferred to a CSF device so that drainage rates were measured. The results of retention evaluation are shown in Table 15 below.

TABLE 15

| Test No. | Flocculant | Ca/Mg Silicate Addition | First Pass Fines Retention |
|---|---|---|---|
| 1 | 1 #/T CPAM | None | 59.06% |
| 2 | 1 #/T CPAM | 2 #/T as $SiO_2$ | 76.95% |
| 3 | 1 #/T CPAM | 4 #/T as $SiO_2$ | 84.67% |
| 4 | 1 #/T CPAM | 6 #/T as $SiO_2$ | 83.85% |
| 5 | None | None | 27.94% |
| 6 | None | 2 #/T as $SiO_2$ | 35.55% |
| 7 | None | 4 #/T as $SiO_2$ | 38.16% |
| 8 | None | 6 #/T as $SiO_2$ | 37.20% |
| 9 | .25 #/T APAM | None | 40.18% |
| 10 | .25 #/T APAM | 2 #/T as $SiO_2$ | 44.46% |
| 11 | .25 #/T APAM | 4 #/T as $SiO_2$ | 45.35% |
| 12 | .25 #/T APAM | 6 #/T as $SiO_2$ | 42.89% |

As illustrated in Table 15, the paper furnishes that were not treated with Ca/Mg silicate complex yield lower retention rate as compared to the paper furnishes that were treated with Ca/Mg silicate complex. The Ca/Mg complex improves retention rate of paper treated with or without flocculant.

Example 15

A control sample (Test No. 1 shown in Table 16 below) was prepared by adding to a paper furnish 10 #/T of cationic starch, 5 #/T of alum, and 0.5 #/T of CPAM (PC8138).

A sample (Test No. 2 shown in Table 16 below) of a commercial microparticle drainage aid, bentonite, was also included in this example. The bentonite used in this example was Bentolite HS and manufactured by Southern Clay Products, Inc. The bentonite was added to a paper furnish that has been pretreated with 10 #/T of cationic starch, 5 #/T of alum, and 0.5 #/T of CPAM (PC8138).

In Test No. 3, a Ca/Mg silicate complex containing 0.3 wt % $SiO_2$ was prepared by mixing 1.04 g of Sodium Silicate N with 98.96 g of fresh water having a hardness of 124 ppm Ca equivalent for about 2 to 3 minute. 2 #/T of the Ca/Mg complex was added to a paper furnish that has been pretreated with 10 #/T of cationic starch, 5 #/T of alum, and 0.5 #/T of CPAM (PC8138).

In Test No. 4, a Ca/Mg silicate complex containing 0.3 wt % $SiO_2$ was prepared by mixing 1.04 g of Sodium Silicate N with 98.96 g of fresh water having a hardness of 124 ppm Ca equivalent for about 2 to 3 minute. 2 #/T of the Ca/Mg complex was added to a paper furnish that has been pretreated with 10 #/T of cationic starch, 5 #/T of alum, and 0.5 #/T of CPAM (PC8138).

In Test No. 5, 0.50 g of 2% $CaCl_2$ was added to 98.45 g of fresh water having a hardness of 124 ppm Ca equivalent. 1.04 g of Sodium Silicate was then mixed with the fresh water for about 2 to 3 minute to form a Ca/Mg silicate complex containing 0.3 wt % $SiO_2$. 2 #/T of the Ca/Mg complex was then added to a paper furnish that has been pretreated with 10 #/T of cationic starch, 5 #/T of alum, and 0.5 #/T of CPAM (PC8138).

In Test No. 6, 0.75 g of 2% $CaCl_2$ was added to 98.21 g of fresh water having a hardness of 124 ppm Ca equivalent. 1.04 g of Sodium Silicate was then mixed with the fresh water for about 2 to 3 minute to form a Ca/Mg silicate complex containing 0.3 wt % $SiO_2$. 2 #/T of the Ca/Mg complex was then added to a paper furnish that has been pretreated with 10 #/T of cationic starch, 5 #/T of alum, and 0.5 #/T of CPAM (PC8138).

In Test No. 7, 1.0 g of 2% $CaCl_2$ was added to 97.96 g of fresh water having a hardness of 124 ppm Ca equivalent. 1.04 g of Sodium Silicate was then mixed with the fresh water for about 2 to 3 minute to form a Ca/Mg silicate complex containing 0.3 wt % $SiO_2$. 2 #/T of the Ca/Mg complex was then added to a paper furnish that has been pretreated with 10 #/T of cationic starch, 5 #/T of alum, and 0.5 #/T of CPAM (PC8138).

In Test No. 8, 1.5 g of 2% $CaCl_2$ was added to 97.46 g of fresh water having a hardness of 124 ppm Ca equivalent. 1.04 g of Sodium Silicate was then mixed with the fresh water for about 2 to 3 minute to form a Ca/Mg silicate complex containing 0.3 wt % $SiO_2$. 2 #/T of the Ca/Mg complex was then added to a paper furnish that has been pretreated with 10 #/T of cationic starch, 5 #/T of alum, and 0.5 #/T of CPAM (PC8138).

In Test No. 9, 2.0 g of 2% $CaCl_2$ was added to 96.96 g of fresh water having a hardness of 124 ppm Ca equivalent. 1.04 g of Sodium Silicate was then mixed with the fresh water for about 2 to 3 minute to form a Ca/Mg silicate complex containing 0.3 wt % $SiO_2$. 2 #/T of the Ca/Mg complex was then added to a paper furnish that has been pretreated with 10 #/T of cationic starch, 5 #/T of alum, and 0.5 #/T of CPAM (PC8138).

The treated paper furnishes were then transferred to a CSF device so that drainage rates were measured. The results of the samples in this example are shown in Table 16 below.

TABLE 16

| Test No. | Sample I.D. | M'/Si Molar ratio | Silicate addition (#/T as $SiO_2$) | CSF (ml) |
|---|---|---|---|---|
| 1 | No additive | | 0 | 436 |
| 2 | Bentonite | 0 | 2 (as solid) | 645 |
| 3 | Ca/Mg Silicate | 0.062 | 2 | 610 |
| 4 | Ca/Mg Silicate | 0.062 | 2 | 631 |
| 5 | Ca/Mg Silicate | 0.08 | 2 | 635 |
| 6 | Ca/Mg Silicate | 0.09 | 2 | 643 |
| 7 | Ca/Mg Silicate | 0.098 | 2 | 657 |
| 8 | Ca/Mg Silicate | 0.116 | 2 | 675 |
| 9 | Ca/Mg Silicate | 0.134 | 2 | 679 |

As illustrated in Table 16, the Ca/Mg silicate complexes and bentonite significantly improve the drainage property of the paper furnish.

Example 16

This example includes nine samples (Test Nos. 1–9 shown in Table 17 below) that were the same as the Test Nos 1–9 in Example 15 above with the exception that after the Ca/Mg silicate complexes were formed (in Test Nos 3–9), they were allowed to stand for about 2 hours before they were added to the pretreated paper furnishes.

The paper furnishes were then transferred to a CSF devise so that drainage rates were measured. After the drainage test, the turbidity of the metal silicate complexes was measured using HACH 2100AN turbidimeter.

The results are summarized in Table 17 below.

TABLE 17

| Test No. | Sample I.D. | M'/Si Molar ratio | Turbidity (NTU) | Silicate addition (#/T as $SiO_2$) | CSF (ml) |
|---|---|---|---|---|---|
| 1 | No additive | | | 0 | 432 |
| 2 | Bentonite | | | 2 (as solid) | 645 |
| 3 | Ca/Mg Silicate | 0.062 | 0.47 | 2 | 681 |
| 4 | Ca/Mg Silicate | 0.062 | 0.53 | 2 | 677 |
| 5 | Ca/Mg Silicate | 0.08 | 1.18 | 2 | 686 |
| 6 | Ca/Mg Silicate | 0.09 | 2.76 | 2 | 691 |
| 7 | Ca/Mg Silicate | 0.098 | 4.82 | 2 | 695 |
| 8 | Ca/Mg Silicate | 0.116 | 18.7 | 2 | 700 |
| 9 | Ca/Mg Silicate | 0.134 | 56.5 | 2 | 700 |

As shown in Table 17, all the metal silicate complexes used in this example were highly effective on drainage improvement. It was also shown that increasing the turbidity of the complex from 18.7 to 56.5 does not benefit the performance of the complexes.

Example 17

A control sample (Test No. 1 in Table 18 shown below) was prepared by adding to a paper furnish 10#/T of cationic starch, 5#/T of alum, and 0.5 #/T CPAM (PC8138).

Three Ca/Mg silicate complexes (Test Nos. 2–4 shown in Table 18 below) containing 0.3% $SiO_2$ and having a 0.116 (Ca+Mg)/Si molar ratio were prepared as follows:

In Test No. 2 (Sample A), 1.5 g of 2% $CaCl_2$ was added to 97.46 g of fresh water having a hardness of 124 ppm Ca equivalent. 1.04 g of Sodium Silicate N was then mixed with the fresh water for about 2 to 3 minutes to form a Ca/Mg silicate complex containing 0.3 wt % $SiO_2$. The Ca/Mg complex was allowed to stand for 5 days. After 5 days, 2 #/T of the Ca/Mg complex was then added to a paper furnish that has been pretreated with 10 #/T of cationic starch, 5 #/T of alum, and 0.5 #/T of CPAM (PC8138). The paper furnish was then transferred to a CSF devise so that drainage rate was measured. After the drainage test, the turbidity of the Ca/Mg silicate complex was measured using HACH 2100AN turbidimeter.

In Test No. 3 (Sample B), 1.5 g of 2% $CaCl_2$ was added to 97.46 g of fresh water having a hardness of 124 ppm Ca equivalent. 1.04 g of Sodium Silicate N was then mixed with the fresh water for about 50 minutes at 7° C. to 9° C. to form a Ca/Mg silicate complex containing 0.3 wt % $SiO_2$. Then 0.5 g of 2% $CaCl_2$ was further added to the mixture containing the Ca/Mg silicate complex for 22 minutes, 2 #/T of the Ca/Mg complex was then added to a paper furnish that has been pretreated with 10 #/T of cationic starch, 5 #/T of alum, and 0.5 #/T CPAM (PC8138). The paper furnish was then transferred to a CSF devise so that drainage rate was measured. After the drainage test, the turbidity of the metal silicate complex was measured using HACH 2100AN turbidimeter.

In Test No. 4, a Ca/Mg complex (Sample C) was prepared by adding 1.0 g of 2% $CaCl_2$ solution to Sample B as described above (for Test No. 3) at 9° C. and mixing for 65 minutes. 2 #/T of the Ca/Mg complex was then added to a paper furnish that has been pretreated with 10 #/T of cationic starch, 5 #/T of alum, and 0.5 #/T of CPAM (PC8138). The paper furnish was then transferred to a CSF devise so that drainage rate was measured. After the drainage test, the turbidity of the Ca/Mg silicate complex was measured using HACH 2100AN turbidimeter.

The results of this example are summarized in Table 18 below.

TABLE 18

| Test No. | Sample I.D. | M'/Si Molar Ratio | Turbidity (NTU) | Silicate addition (#/T $SiO_2$) | CSF (ml) |
|---|---|---|---|---|---|
| 1 | No additive | | | 0 | 432 |
| 2 | Sample A | 0.116 | 29.58 | 2 | 696 |
| 3 | Sample B | 0.134 | 30.35 | 2 | 695 |
| 4 | Sample C | 0.170 | 71 | 2 | 455 |

As shown in Table 18, when the turbidity of the metal silicate complexes increases from about 30 NTU to 71 NTU, drainage performance drastically drops.

The above examples illustrate that by using an aqueous solution containing metal ions, such as $Mg^{2+}$ and/or $Ca^{2+}$ ions to dilute the sodium silicate so that the sodium silicate was converted to active magnesium and/or calcium silicates, drainage and retention properties of the paper furnish were significantly improved.

The above examples also illustrate that by adding sodium silicate to the paper furnish, drainage and retention properties of the paper furnish were also improved.

The above examples also illustrate that the addition of at least one of the additives selected from a cationic starch, a coagulant, and a flocculent, followed by the addition of a water soluble metal complex or sodium silicate to the paper furnish, improves drainage and retention properties and is cost effective in manufacturing paper and paperboard.

The preceding examples can be repeated with similar success by substituting the generically and specifically described constituents and/or operating conditions of this invention for those used in the preceding examples. From the foregoing descriptions, one skilled in the art can easily ascertain the essential characteristics of this invention, and without departing from the spirit and scope thereof, can make various changes and modifications of the invention to adapt to various usages and conditions.

What is claimed is:

1. An aqueous composition, comprising a water-soluble metal silicate complex that contains at least one divalent metal, wherein the water-soluble metal silicate complex comprises a water-soluble silicate in accordance with the following formula:

$(1-y)M_2O.yM'O.xSiO_2$ wherein M is monovalent cation; M' is divalent metal ion; x is from about 2 to 4; y is from about 0.005 to 0.4; and y/x is from about 0.001 to 0.25.

2. The aqueous composition of claim 1, wherein the divalent metal comprises at least one of magnesium, calcium, zinc, copper, iron(II), manganese(II), and barium.

3. The aqueous composition of claim 1, wherein the divalent metal comprises one of magnesium and calcium.

4. The aqueous composition of claim 1, wherein the water-soluble metal silicate complex has a $SiO_2$ to monovalent cation oxide molar ratio of about 2 to 20.

5. The aqueous composition of claim 1, wherein the water-soluble metal silicate complex has a $SiO_2$ to monovalent cation oxide molar ratio of about 3 to 5.

6. The aqueous composition of claim 1, wherein the water-soluble metal silicate complex has a divalent metal to silicon molar ratio of about 0.001 to 0.25.

7. The aqueous composition of claim 1, wherein the water-soluble metal silicate complex has a divalent metal to silicon molar ratio of about 0.01 to 0.2.

8. The aqueous composition of claim 1, wherein the aqueous composition has a concentration of $SiO_2$ of about 0.01 to 5 wt %.

9. The aqueous composition of claim 1, wherein the aqueous composition has a concentration of $SiO_2$ of about 0.1 to 2 wt %.

10. The aqueous composition of claim 2, wherein the water-soluble metal silicate complex has a $SiO_2$ to monovalent cation oxide molar ratio of about 2 to 20.

11. The aqueous composition of claim 2, wherein the water-soluble metal silicate complex has a divalent metal to silicon molar ratio of about 0.001 to 0.25.

12. The aqueous composition of claim 2, wherein the aqueous composition has a concentration of $SiO_2$ of about 0.01 to 5 wt %.

13. The aqueous composition of claim 4, wherein the water-soluble metal silicate complex has a divalent metal to silicon molar ratio of about 0.001 to 0.25.

14. The aqueous composition of claim 4, wherein the aqueous composition has a concentration of $SiO_2$ of about 0.01 to 5 wt %.

15. The aqueous composition of claim 6, wherein the aqueous composition has a concentration of $SiO_2$ of about 0.01 to 5 wt %.

16. The aqueous composition of claim 1, wherein the water-soluble metal silicate complex has a particle size of less than about 200 nm.

17. The aqueous composition of claim 1, wherein M comprises sodium, potassium, lithium, or ammonium.

18. The aqueous composition of claim 1, wherein M comprises sodium.

19. The aqueous composition of claim 1, wherein M' comprises calcium or magnesium.

20. The aqueous composition of claim 1, wherein the water-soluble metal silicate complex has a $SiO_2/M_2O$ molar ratio of about 2 to 20.

21. The aqueous composition of claim 1, wherein the water-soluble metal silicate complex has an M'/Si molar ratio of about 0.001 to 0.25.

22. The aqueous composition of claim 1, wherein:
M is sodium,
M' is calcium or magnesium,
x/(1−y) is from about 2 to 20, and
the aqueous composition has a concentration of $SiO_2$ of about 0.01 to 5 wt %.

23. The process of claim 22, wherein:
y/X is from about 0.01 to 0.2,
x/(1−y) is from about 3 to 10, and the aqueous composition has a concentration of $SiO_2$ of about 0.1 to 2 wt %.

24. The process of claim 22, wherein:
y/x is from about 0.025 to 0.15,
x/(1−y) is from about 3 to 5, and
aqueous composition has a concentration of $SiO_2$ of about 0.25 to 1.5 wt %.

25. A process for preparing an aqueous composition including water-soluble metal silicate complex, comprising combining monovalent cation silicate and divalent metal ions in an aqueous environment to form the water-soluble metal silicate complex, wherein the water-soluble soluble metal silicate complex comprises a water-soluble silicate in accordance with the following formula:

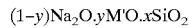

$(1-y)Na_2O.yM'O.xSiO_2$ where
M' is divalent metal ion comprising calcium or magnesium,
x is from about 2 to 4,
y is from about 0.005 to 0.4,
y/x is from about 0.001 to 0.25,
x/(1−y) is from about 2 to 20, and
the aqueous composition has a concentration of $SiO_2$ of about 0.01 to 5 wt %.

26. The process of claim 25, wherein the water-soluble metal silicate complex has a $SiO_2$ to monovalent cation oxide molar ratio of about 2 to 20.

27. The process of claim 25, wherein the water-soluble metal silicate complex has a $SiO_2$ to monovalent cation oxide molar ratio of about 3 to 5.

28. The process of claim 25, wherein the water-soluble metal silicate complex has a divalent metal to silicon molar ratio of about 0.001 to 0.25.

29. The process of claim 25, wherein the aqueous composition has a concentration of $SiO_2$ of about 0.01 to 5 wt %.

30. The process of claim 25, wherein the monovalent cation silicate comprises at least one of sodium silicate, potassium silicate, lithium silicate, and ammonium silicate.

31. The process of claim 25, wherein the monovalent cation silicate comprises sodium silicate.

32. The process of claim 31, wherein the sodium silicate has a weight ratio of $SiO_2/Na_2O$ of about 2 to 4.

33. The process of claim 25, wherein the divalent metal ions comprise at least one of magnesium, calcium, zinc, copper, iron(II), manganese(II), and barium.

34. The process of claim 25, wherein the divalent metal ions comprise at least one of magnesium and calcium.

35. The process of claim 25, wherein the water-soluble metal silicate complex is prepared by adding monovalent cation silicate to an aqueous reactant composition having a sufficient amount of divalent metal ions to form the water-soluble metal silicate complex.

36. The process of claim 35, wherein the aqueous reactant composition having a sufficient amount of divalent metal ions has a hardness of about 1 to 600 ppm Ca equivalent.

37. The process of claim 35, wherein the aqueous reactant composition comprises at least one of tray water, hard water, and treated water which treated water is prepared by increasing or decreasing hardness.

38. The process of claim 35, wherein a source of the divalent metal ions comprises at least one of $CaCl_2$, $MgCl_2$, $MgSO_4$, $Ca(NO_3)_2$, $Mg(NO_3)_2$, $CaSO_4$, and $ZnSO_4$.

39. The process of claim 25, wherein the water-soluble metal silicate complex is prepared by adding divalent metal ions to an aqueous reactant composition having a sufficient amount of monovalent cation silicate to form the water-soluble metal silicate complex.

40. The process of claim 39, wherein the aqueous reactant composition having a sufficient amount of monovalent cation silicate has a concentration of $SiO_2$ of about 0.01 to 30 wt %.

41. The aqueous composition prepared by the process of claim 25.

42. A process of modifying cellulose slurry, comprising adding an aqueous composition having water-soluble metal silicate complex which includes divalent metal to cellulose slurry, wherein the water-soluble metal silicate complex comprises a water-soluble silicate in accordance with the following formula:

$$(1-y)M_2O \cdot yM'O \cdot xSiO_2$$

wherein M is monovalent cation; M' is divalent metal ion; x is from about 2 to 4; y is from about 0.005 to 0.4; and y/x is from about 0.001 to 0.25.

43. The process of claim 42, wherein the divalent metal comprises at least one of magnesium, calcium, zinc, copper, iron(II), manganese(II), and barium.

44. The process of claim 42, wherein the divalent metal comprises at least one of magnesium and calcium.

45. The process of claim 42, wherein the water-soluble metal silicate complex has a $SiO_2$ to monovalent cation oxide molar ratio of about 2 to 20.

46. The process of claim 42, wherein the water-soluble metal silicate complex has a $SiO_2$ to monovalent cation oxide molar ratio of about 3 to 5.

47. The process of claim 42, wherein the water-soluble metal silicate complex has a divalent metal to silicon molar ratio of about 0.001 to 0.25.

48. The process of claim 42, wherein the water-soluble metal silicate complex has a divalent metal to silicon molar ratio of about 0.01 to 0.2.

49. The process of claim 42, wherein the aqueous composition has a concentration of $SiO_2$ of about 0.01 to 5 wt %.

50. The process of claim 42, wherein the aqueous composition has a concentration of $SiO_2$ of about 0.1 to 2 wt %.

51. The process of claim 43, wherein the water-soluble metal silicate complex has a $SiO_2$ to monovalent cation oxide molar ratio of about 2 to 20.

52. The process of claim 43, wherein the water-soluble metal silicate complex has a divalent metal to silicon molar ratio of about 0.001 to 0.25.

53. The process of claim 43, wherein the aqueous composition has a concentration of $SiO_2$ of about 0.01 to 5 wt %.

54. The process of claim 45, wherein the water-soluble metal silicate complex has a divalent metal to silicon molar ratio of about 0.001 to 0.25.

55. The process of claim 45, wherein the aqueous composition has a concentration of $SiO_2$ of about 0.01 to 5 wt %.

56. The process of claim 47, wherein the aqueous composition has a concentration of $SiO_2$ of about 0.01 to 5 wt %.

57. The process of claim 42, wherein the water-soluble metal silicate complex has a particle size of less than about 200 nm.

58. The process of claim 42, wherein a source of the divalent metal comprises at least one of $CaCl_2$, $MgCl_2$, $MgSO_4$, $Ca(NO_3)_2$, $Mg(NO_3)_2$, $CaSO_4$, and $ZnSO_4$.

59. The process of claim 42, wherein M comprises sodium, potassium, lithium, or ammonium.

60. The process of claim 42, wherein M comprises sodium.

61. The process of claim 42, wherein M' comprises calcium or magnesium.

62. The process of claim 42, wherein the water-soluble metal silicate complex has a $SiO_2/M_2O$ molar ratio of about 2 to 20.

63. The process of claim 42, wherein the water-soluble metal silicate complex has an M'/Si molar ratio of about 0.001 to 0.25.

64. The process of claim 42, wherein the aqueous composition having the water-soluble metal silicate complex is prepared by adding monovalent cation silicate to an aqueous reactant composition having a hardness of about 1 to 600 ppm Ca equivalent.

65. The process of claim 64, wherein the aqueous reactant composition comprises at least one of tray water, hard water, and treated water which treated water is prepared by increasing or decreasing hardness.

66. The process of claim 42, wherein the aqueous composition having the water-soluble metal silicate complex is prepared by adding a source of the divalent metal to an aqueous reactant composition of a sufficient amount of monovalent cation silicate to form the water-soluble metal silicate.

67. The process of claim 66, wherein the aqueous reactant composition has a concentration of $SiO_2$ of about 0.01 to 30 wt %.

68. The process of claim 42, wherein the water-soluble metal silicate complex is added to the cellulose slurry after a last high shear stage and before a headbox.

69. The process of claim 42, wherein at least one additive comprising at least one of flocculant, starch, and coagulant, is added to the cellulose slurry.

70. The process of claim 69, wherein the at least one additive comprises flocculant, and wherein the flocculant comprises cationic polyacrylamide copolymer.

71. The process of claim 69, wherein the at least one additive is added to the cellulose slurry at a point before a last high shear stage.

72. The process of claim 64, wherein the water-soluble metal silicate complex comprises at least one of magnesium silicate complex and calcium silicate complex prepared by adding sodium silicate to an aqueous reactant composition containing at least one of magnesium and calcium ions, the aqueous reactant composition has a hardness of about 1 to 600 ppm Ca equivalent, the water-soluble metal silicate has a $SiO_2/Na_2O$ molar ratio of about 2 to 20, and a (Mg+Ca)/Si molar ratio of about 0.001 to 0.25, and the aqueous composition has a concentration of $SiO_2$ of about 0.01 to 5 wt %.

73. The process of claim 72, wherein at least one additive comprising at least one of flocculant, starch, and coagulant is added to the cellulose slurry.

74. The process of claim 73, wherein the at least one additive comprises flocculant, and wherein the flocculant comprises cationic polyacrylamide copolymer.

75. The process of claim 42, wherein:

M is sodium,

M' is calcium or magnesium, x/(1−y) is from about 2 to 20, the aqueous composition has a concentration of $SiO_2$ of about 0.01 to 5 wt %, and at least one of flocculant, starch, and coagulant is added to the cellulose slurry.

76. The cellulose slurry produced by the process of claim 42.

77. The cellulose slurry produced by the process of claim 75.

78. A process for preparing cellulose slurry, comprising adding monovalent cation silicate to an aqueous cellulose slurry comprising a sufficient amount of divalent metal ions to combine with the monovalent cation silicate to form water-soluble metal silicate complex, wherein the water-soluble metal silicate complex comprises a water-soluble silicate in accordance with the following formula:

$$(1-y)M_2O \cdot yM'O \cdot xSiO_2$$

wherein M is monovalent cation; M' is divalent metal ion; x is from about 2 to 4; y is from about 0.005 to 0.4; and y/x is from about 0.001 to 0.25.

79. The process of claim 78, wherein the cellulose slurry has a hardness of about 1 to 600 ppm Ca equivalent.

80. The process of claim 78, wherein the monovalent cation silicate comprises at least one of sodium silicate, potassium silicate lithium silicate, and ammonium silicate.

81. The process of claim 78, wherein the monovalent cation silicate comprises sodium silicate.

82. The process of claim 81, wherein the sodium silicate has a weight ratio of $SiO_2/Na_2O$ of about 2 to 4.

83. The process of claim 78, wherein the divalent metal ions comprise at least one of magnesium, calcium, zinc, copper, iron(II), manganese(II), and barium.

84. The process of claim 78, wherein the divalent metal ions comprise at least one of magnesium and calcium.

85. A process of making cellulose product, comprising:

adding an aqueous composition having water-soluble metal silicate complex including divalent metal to cellulose slurry, wherein the water-soluble metal silicate complex comprises a water-soluble silicate in accordance with the following formula:

$$(1-y)M_2O.yM'O.xSiO_2$$

wherein M is monovalent cation; M' is divalent metal ion; x is from about 2 to 4; y is from about 0.005 to 0.4; and y/x is from about 0.001 to 0.25; and forming cellulose product from the cellulose slurry.

86. The process of claim 85, wherein the divalent metal comprises at least one of magnesium, calcium, zinc, copper, iron(II), manganese(II), and barium.

87. The process of claim 85, wherein the divalent metal comprises at least one of magnesium and calcium.

88. The process of claim 85, wherein the water-soluble metal silicate complex has a $SiO_2$/monovalent cation oxide molar ratio of about 2 to 20.

89. The process of claim 85, wherein the water-soluble metal silicate complex has an divalent metal/Si molar ratio of about 0.001 to 0.25.

90. The process of claim 85, wherein the aqueous composition has a concentration of $SiO_2$ of about 0.01 to 5 wt %.

91. The process of claim 85, wherein the water-soluble metal silicate complex comprises at least one of magnesium silicate complex and calcium silicate complex prepared by adding sodium silicate to an aqueous reactant composition containing at least one of magnesium and calcium ions, the aqueous reactant composition has a hardness of about 1 to 600 ppm Ca equivalent, the water-soluble metal silicate has a $SiO_2/Na_2O$ molar ratio of about 2 to 20, and a (Mg+Ca)/Si molar ratio of about 0.001 to 0.25, and the aqueous composition has a concentration of $SiO_2$ of about 0.01 to 5 wt %.

92. The process of claim 91, wherein at least one of flocculant, starch, and coagulant is added to the cellulose slurry.

93. The cellulose product of the process of claim 85.

94. The cellulose product of the process of claim 91.

95. A process of making cellulose product, comprising:

adding monovalent cation silicate to an aqueous cellulose slurry comprising a sufficient amount of divalent metal ions to combine with the monovalent cation silicate to form water-soluble metal silicate complex, wherein the water-soluble metal silicate complex comprises a water-soluble silicate in accordance with the following formula:

$$(1-y)M_2O.yM'O.xSiO_2$$

wherein M is monovalent cation; M' is divalent metal ion; x is from about 2 to 4; y is from about 0.005 to 0.4; and y/x is from about 0.001 to 0.25; and forming cellulose product from the cellulose slurry.

96. A cellulose product comprising cellulose fiber and residue of an aqueous composition comprising at least one water-soluble metal silicate complex, wherein the water-soluble metal silicate complex comprises a water-soluble silicate in accordance with the following formula:

$$(1-y)M_2O.yM'O.xSiO_2$$

wherein M is monovalent cation; M' is divalent metal ion; x is from about 2 to 4; y is from about 0.005 to 0.4; and y/x is from about 0.001 to 0.25.

97. The cellulose product of claim 96, wherein the residue is present in the cellulose product in an amount of about 50 to 10,000 ppm, based on $SiO_2$.

98. A process for waste water treatment, comprising adding at least one water-soluble metal silicate complex to waste water, wherein the water-soluble metal silicate complex includes divalent metal, wherein the water-soluble metal silicate complex comprises a water-soluble silicate in accordance with the following formula:

$$(1-y)M_2O.yM'O.xSiO_2$$

wherein M is monovalent cation; M' is divalent metal ion; x is from about 2 to 4; y is from about 0.005 to 0.4; and y/x is from about 0.001 to 0.25.

99. A process for waste water treatment, comprising adding monovalent cation silicate to waste water, wherein the waste water comprises divalent metal ions in an amount sufficient to combine with the monovalent cation silicate to form water-soluble metal silicate complex, wherein the water-soluble metal silicate complex comprises a water-soluble silicate in accordance with the following formula:

$$(1-y)M_2O.yM'O.xSiO_2$$

wherein M is monovalent cation; M' is divalent metal ion; x is from about 2 to 4; y is from about 0.005 to 0.4; and y/x is from about 0.001 to 0.25.

* * * * *